(12) United States Patent
Barnes et al.

(10) Patent No.: US 6,757,731 B1
(45) Date of Patent: Jun. 29, 2004

(54) APPARATUS AND METHOD FOR INTERFACING MULTIPLE PROTOCOL STACKS IN A COMMUNICATION NETWORK

(75) Inventors: Frank Barnes, Nashua, NH (US); Sandipan Basu, Burlington, MA (US); Donald McGinley, New Boston, NH (US); Richard Crump, Boston, MA (US); Arvind Kukreja, Burlington, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/478,391

(22) Filed: Jan. 6, 2000

Related U.S. Application Data

(60) Provisional application No. 60/121,623, filed on Feb. 25, 1999.

(51) Int. Cl.[7] .............................................. G06F 15/16
(52) U.S. Cl. ...................... 709/227; 709/230; 709/236; 709/240; 370/469; 370/389
(58) Field of Search ................................. 709/227, 230, 709/228, 250, 236, 245, 226, 229, 217, 240, 223; 370/469, 231, 236, 389; 703/26

(56) References Cited

U.S. PATENT DOCUMENTS

| | | | | |
|---|---|---|---|---|
| 5,778,189 A | * | 7/1998 | Kimura et al. ............... | 709/236 |
| 5,802,053 A | | 9/1998 | Bollella et al. | |
| 5,940,390 A | * | 8/1999 | Berl et al. ................... | 370/389 |
| 5,991,818 A | * | 11/1999 | Williams | |
| 6,084,879 A | * | 7/2000 | Berl et al. ................... | 370/389 |
| 6,112,245 A | * | 8/2000 | Araujo et al. | |
| 6,115,751 A | * | 9/2000 | Tam et al. ................... | 709/240 |
| 6,223,222 B1 | * | 4/2001 | Fijolek et al. | |
| 6,226,676 B1 | * | 5/2001 | Crump et al. | |
| 6,256,322 B1 | * | 7/2001 | Wilson, Jr. ................... | 370/469 |
| 6,324,583 B1 | * | 11/2001 | Stevens | |
| 6,430,622 B1 | * | 8/2002 | Aiken et al. ................. | 709/245 |
| 6,490,618 B1 | * | 12/2002 | Ferguson et al. ........... | 709/223 |

FOREIGN PATENT DOCUMENTS

| | | |
|---|---|---|
| EP | 0 667 693 A2 | 8/1995 |
| EP | 0 767 564 A2 | 4/1997 |

OTHER PUBLICATIONS

Alexander et al, Integrating the Portable APPN Stack Into a Multiprotocol Router, IEEE, Mar. 26, 1995, pp. 133–141.
Muralidharan, Multiprotocol Management Agents: A Look at an Implementation and the Issues to Consider, IEEE Journal on Selected Areas in Communications, Dec. 11, (1993), No. 9, New York, NY, US, pp. 1336–1345.

* cited by examiner

*Primary Examiner*—Patrice Winder
*Assistant Examiner*—Thu Ha Nguyen
(74) *Attorney, Agent, or Firm*—Steubling McGuinness & Manaras LLP

(57) ABSTRACT

A system, device, and method for interfacing multiple protocol stacks in a communication network utilizes a virtual circuit subsystem to interconnect protocol stacks internally within a network device. The virtual circuit subsystem establishes a virtual connection between at least a first protocol of a first protocol stack and a second protocol of a second protocol stack. The virtual circuit subsystem enables messages to be exchanged between the first protocol of the first protocol stack and the second protocol of the second protocol stack over the virtual connection. Specifically, the virtual circuit subsystem converts a transmitted message received from the first protocol into a received message for the second protocol, and converts a transmitted message received from the second protocol into a received message for the first protocol.

18 Claims, 17 Drawing Sheets

Router network showing APPN connected over DLSw.

Router network showing mixed DLSw and APPN network segments

Router network showing APPN/DLUR Integrated with DLSw.

APPARATUS AND METHOD FOR INTERFACING MULTIPLE PROTOCOL STACKS IN A COMMUNICATION NETWORK

The present patent application claims priority from the commonly-owned U.S. Provisional Patent Application No. 60/121,623 entitled APPARATUS AND METHOD FOR INTERNALLY INTERCONNECTING MULTIPLE PROTOCOL STACKS FOR INTEGRATING NETWORK SEGMENTS USING DIFFERENT PROTOCOLS, which was filed on Feb. 25, 1999 in the names of Frank Barnes, Richard Crump, Sandipan Basu, Arvind Kukreja, and Donald McGinley, and is hereby incorporated herein by reference in its entirety.

FIELD OF THE INVENTION

The present invention relates generally to communication systems, and more particularly to interfacing multiple protocol stacks within a network device.

BACKGROUND OF THE INVENTION

In today's information age, it is common for computers and computer peripherals to be internetworked over a communication network. The various network devices in the communication network communicate using various protocols.

Within a particular network device, the various protocols are organized into one or more protocol stacks. A protocol stack is essentially a grouping of related protocols. Each protocol of a protocol stack operates at a particular layer of the protocol stack. A protocol operating at a particular layer of the protocol stack provides services to protocols at the next higher layer in the protocol stack and consumes services provided by protocols at the next lower layer in the protocol stack.

In certain networking situations, it is necessary or desirable for protocol messages to be exchanged between protocol stacks of the network device. Typically, this is accomplished by associating each protocol stack with a network interface and providing a connection between the various network interfaces over which protocol messages can be exchanged. For example, the various network interfaces may be connected using a crossover cable or a local area network (LAN). In any case, this connection is external to the network device.

This technique for interfacing protocol stacks has a number of drawbacks. For one, any network interfaces that are utilized for interfacing protocol stacks are not available for other networking functions. Also, installation and maintenance of the external connection adds complexity and cost.

Thus, a technique for interfacing protocol stacks that does not utilize network interfaces and does not require any external connections is needed.

SUMMARY OF THE INVENTION

In accordance with one aspect of the invention, a virtual circuit subsystem is used to interconnect protocol stacks internally within a network device. The virtual circuit subsystem establishes a virtual connection between at least a first protocol of a first protocol stack and a second protocol of a second protocol stack. The virtual circuit subsystem enables messages to be exchanged between the first protocol of the first protocol stack and the second protocol of the second protocol stack over the virtual connection. Specifically, the virtual circuit subsystem converts a transmitted message received from the first protocol into a received message for the second protocol, and converts a transmitted message received from the second protocol into a received message for the first protocol. Thus, the virtual circuit subsystem eliminates the need to connect protocol stacks externally.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the present invention utilizes a virtual circuit (VCCT) subsystem within the network device to internally interface protocol stacks. The VCCT subsystem establishes a virtual connection between a first protocol of a first protocol stack and a second protocol of a second protocol stack. The VCCT subsystem exchanges protocol messages between the first protocol and the second protocol, specifically by converting a protocol message transmitted by the first protocol into a received message for the second protocol and converting a protocol message transmitted by the second protocol into a received message for the first protocol. In this way, protocol stacks may be interfaced without utilizing network interfaces and without requiring any external connections.

More specifically, the VCCT subsystem emulates a lower protocol layer for both the first protocol of the first protocol stack and the second protocol of the second protocol stack. The VCCT subsystem provides a number of application program interfaces (APIs) for emulating various lower protocol layers. The first protocol interfaces with the VCCT subsystem via a first API, while the second protocol interfaces with the VCCT subsystem via a second API. The first API and the second API may emulate the same or different lower protocol layers. In an exemplary embodiment of the invention, the VCCT subsystem emulates a data link layer for both the first protocol and the second protocol, and the virtual connection between the first protocol of the first protocol stack and the second protocol of the second protocol stack is a virtual data link layer connection over which protocol messages are exchanged.

Figure 1:
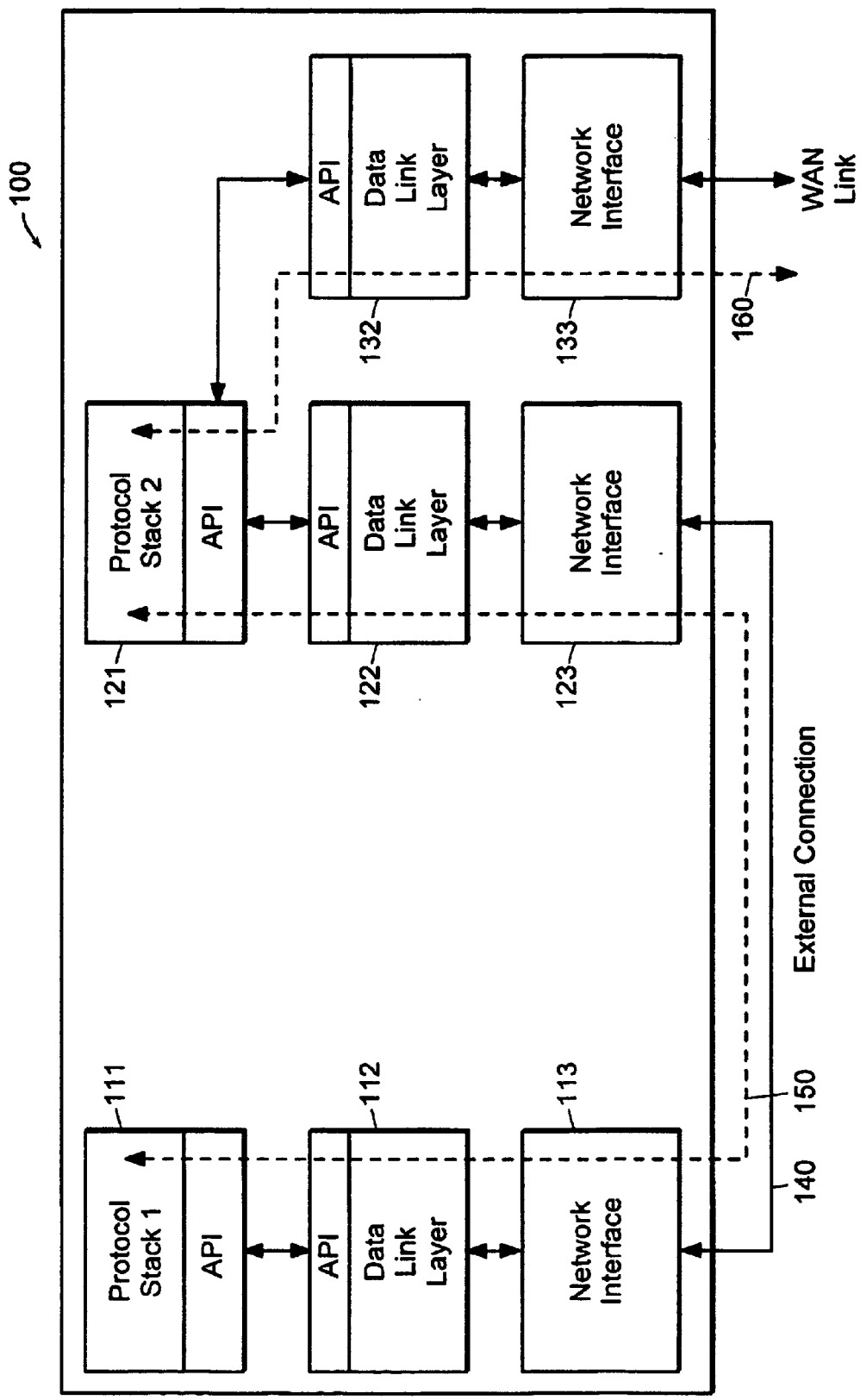
FIG. 1 is a block diagram showing an exemplary network device in which two protocol stacks are interconnected using an external connection as is known in the prior art.

In a prior art embodiment, two protocol stacks are interconnected using an external connection. FIG. 1 is a block diagram showing an exemplary network device 100 in which two protocol stacks are interconnected using an external connection. The network device 100 includes a first protocol stack 111 and a second protocol stack 121. The first protocol stack 111 is coupled through an API to a first data link layer 112, which in turn is coupled to a first network interface 113. The second protocol stack 121 is coupled through an API to a second data link layer 122, which in turn is coupled to a second network interface 123. The first network interface 113 and the second network interface 123 are interconnected via an external connection 140, such as a cross-over cable or LAN. Protocol messages are exchanged between the first protocol stack 111 and the second protocol stack 121 over the external connection 140, as shown by the protocol message flow 150. The second protocol stack 121 is also coupled through an API to a third data link layer 132, which in turn is coupled to a third network interface 133. The third network interface 133 is coupled to a network, for example, via a Wide-Area Network (WAN) link. The second protocol stack 121 transmits and receives protocol messages over the WAN link via the third data link layer 132 and the third network interface 133, as shown by the protocol message flow 160. Thus, for example, a protocol message generated by the first protocol stack 111 is sent to the second protocol stack 121 over the external connection 140, as shown by the protocol message flow 150, and the second protocol stack 121 forwards the protocol message over the WAN link, as shown by the protocol message flow 160. Similarly, a protocol message received over the WAN link is forwarded to the second protocol stack 121, as shown by the protocol message flow 160, and the second protocol stack 121 forwards the protocol message to the first protocol stack 111 over the external connection 140, as shown by the protocol message flow 150.

Figure 2:
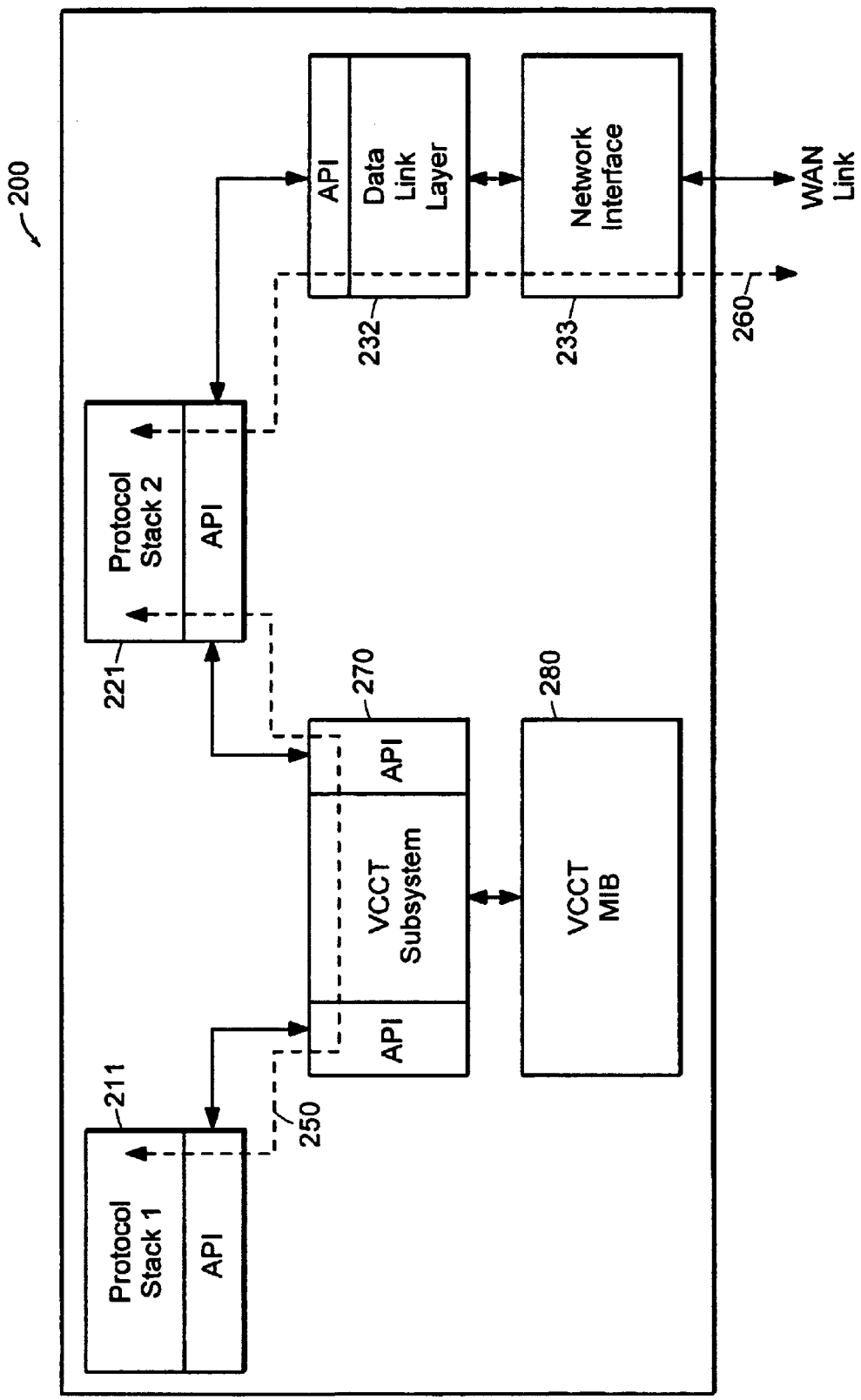
FIG. 2 is a block diagram showing an exemplary network device in which two protocol stacks are interconnected internally in accordance with an embodiment of the present invention.

However, in an embodiment of the present invention, two protocol stacks are interconnected internally via a VCCT subsystem. FIG. 2 is a block diagram showing an exemplary network device 200 in which two protocol stacks are interconnected internally via a VCCT subsystem. The network device 200 includes a first protocol stack 211 and a second protocol stack 221. The first protocol stack 211 is coupled through an API to the VCCT subsystem 270. The second protocol stack 221 is coupled through an API to the VCCT subsystem 270. The VCCT subsystem 270 establishes a virtual connection between the first protocol stack 211 and the second protocol stack 221 based upon configuration information maintained in a VCCT Management Information Base (MIB) 280. Protocol messages are exchanged between the first protocol stack 211 and the second protocol stack 221 over the virtual connection established by the VCCT subsystem 270, as shown by the protocol message flow 250. The second protocol stack 221 is also coupled through an API to a data link layer 232, which in turn is coupled to a network interface 233. The network interface 233 is coupled to a network, for example, via a Wide-Area Network (WAN) link. The second protocol stack 221 transmits and receives protocol messages over the WAN link via the data link layer 232 and the network interface 233, as shown by the protocol message flow 260. Thus, for example, a protocol message generated by the first protocol stack 211 is sent to the second protocol stack 221 via the VCCT subsystem 270, as shown by the protocol message flow 250, and the second protocol stack 221 forwards the protocol message over the WAN link, as shown by the protocol message flow 260. Similarly, a protocol message received over the WAN link is forwarded to the second protocol stack 221, as shown by the protocol message flow 260, and the second protocol stack 221 forwards the protocol message to the first protocol stack 211 via the VCCT subsystem 270, as shown by the protocol message flow 250.

Figure 3:
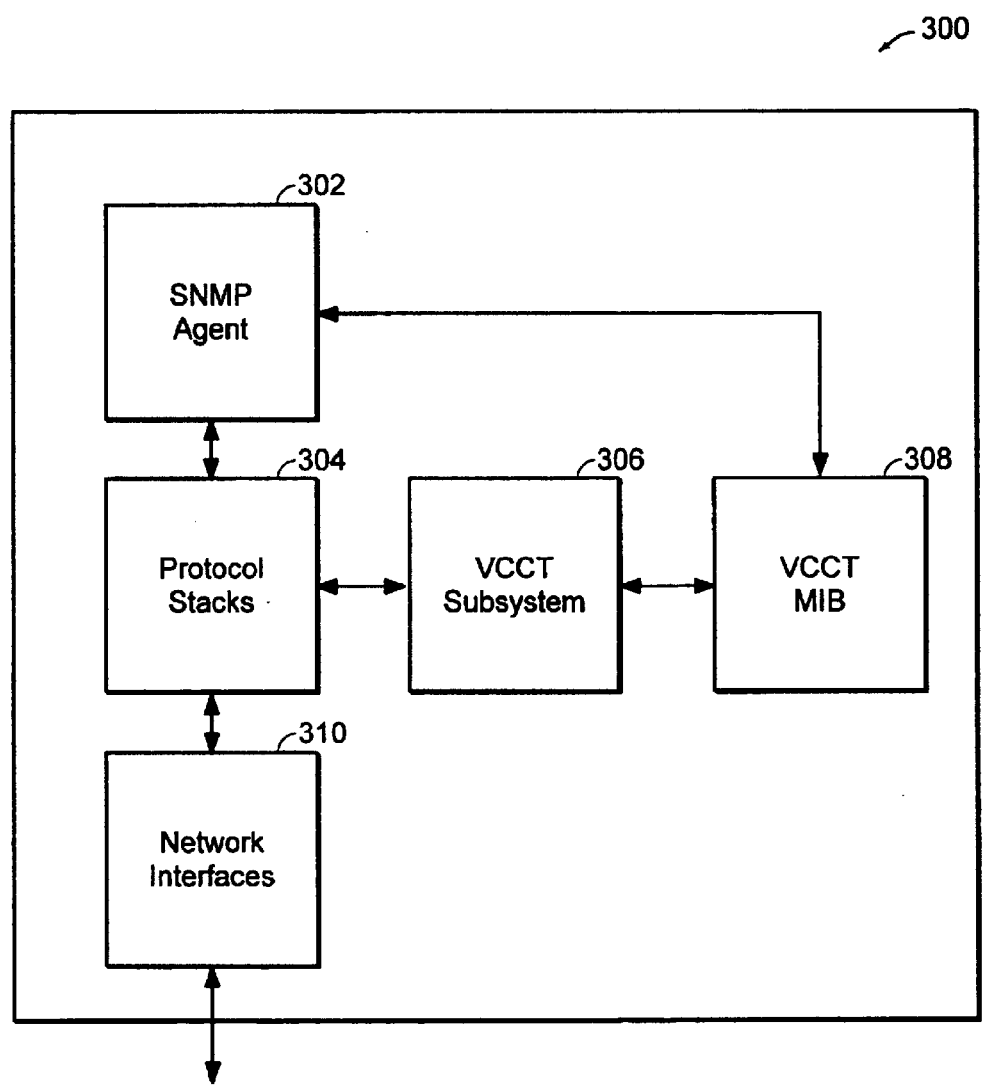
FIG. 3 is a block diagram showing relevant logic blocks of an exemplary network device in accordance with an embodiment of the present invention.

FIG. 3 is a block diagram showing relevant logic blocks of an exemplary network device 300 in accordance with an embodiment of the present invention. The network device 300 includes, among other things, a Simple Network Management Protocol (SNMP) agent 302, various protocol stacks 304, various network interfaces 310, a VCCT subsystem 306, and a VCCT MIB 308. The network interfaces 310 are used to couple the network device 300 to various communication media. The protocol stacks 304 enable the network device 300 to operate in various networking environments. The VCCT subsystem 306 is used to establish virtual connections between various protocol stacks 304 that are required to interoperate. The VCCT subsystem 306 is managed through the VCCT MIB 308. The SNMP agent 302 is accessed through various protocol stacks 304, and provides certain management functions for the network device 300, including maintenance of the VCCT MIB 308.

Figure 4:
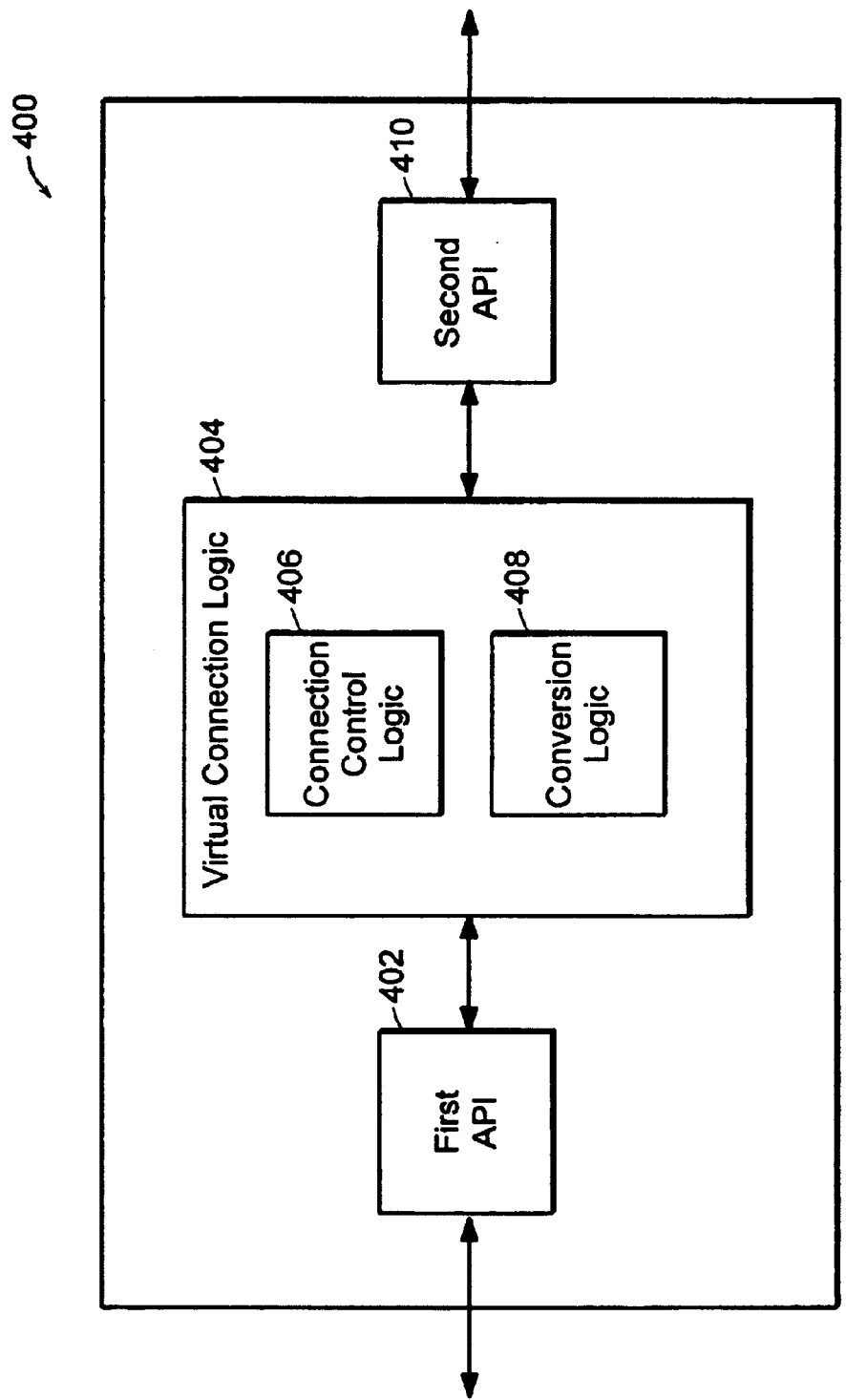
FIG. 4 is a block diagram showing relevant logic blocks of an exemplary virtual circuit subsystem in accordance with an embodiment of the present invention.

FIG. 4 is a block diagram showing relevant logic blocks of an exemplary VCCT subsystem 400. The VCCT subsystem 400 includes at least a first API 402 and a second API 410 for interfacing with various protocol stacks, and more specifically with various protocol layers of the protocol stacks. The first API 402 and the second API 410 are coupled through virtual connection logic 404. The virtual connection logic 404 includes connection control logic 406 and conversion logic 408. The connection control logic 406 establishes a virtual connection between the first API 402 and the second API 410. The conversion logic 408 converts a transmitted message received from one API, such as the first API 402, into a received message for the other API, such as the second API 410.

In order for two protocol stacks to be interconnected, the VCCT subsystem first creates a virtual connection between the two protocol stacks, and more specifically between a first protocol of a first protocol stack and a second protocol of a second protocol stack. This is essentially done in three phases, namely an initialization phase, a registration phase, and a connection establishment phase. In the initialization phase, the protocol stacks and the VCCT subsystem are initialized, and the VCCT subsystem creates a "circuit" having the required APIs for interconnecting the first protocol and the second protocol. In the registration phase, the first protocol registers with a first API that is associated with the circuit, and the second protocol registers with a second API that is associated with the circuit. In the connection establishment phase, the virtual connection is established between the first protocol and the second protocol. In an exemplary embodiment of the invention, the VCCT subsystem creates the circuit based upon configuration information stored in the VCCT MIB. Each protocol then sends a registration request to the VCCT subsystem in order to register with the appropriate API that is associated with the circuit. One protocol then sends a connection request message to the VCCT subsystem, prompting the VCCT subsystem to establish the virtual connection between the two protocols.

Once the virtual connection is established between the first protocol and the second protocol, the VCCT subsystem transfers protocol messages between the first protocol and the second protocol over the virtual connection. This involves converting a transmitted message received from one protocol into a received message for the other protocol. Specifically, upon receiving a transmitted message from the first protocol of the first protocol stack via the first API, the VCCT subsystem converts the message into a received message for the second protocol of the second protocol stack, and forwards the converted message to the second protocol of the second protocol stack via the second API. Likewise, upon receiving a transmitted message from the second protocol of the second protocol stack via the second API, the VCCT subsystem converts the message into a received message for the first protocol of the first protocol stack, and forwards the converted message to the first protocol of the first protocol stack via the first API. These conversions may involve modifying the contents of the message, translating the message from one protocol to the other protocol, copying the message from one buffer to another buffer, modifying buffer descriptors, or other conversions.

Figure 5:
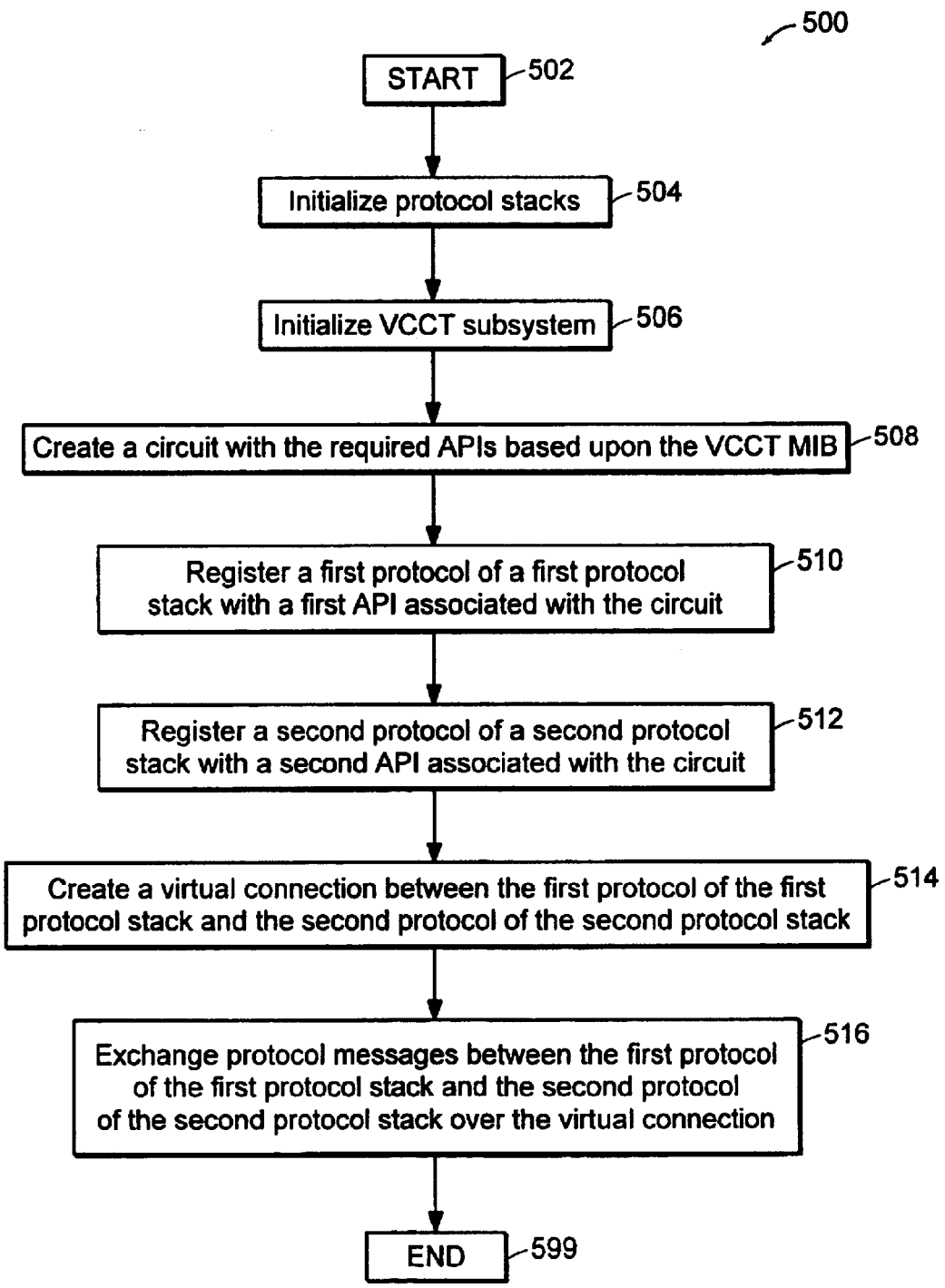
FIG. 5 is a logic flow diagram showing exemplary logic for interconnecting two protocol stacks in accordance with an embodiment of the present invention.

FIG. 5 is a logic flow diagram showing exemplary logic 500 for interconnecting two protocol stacks in accordance with an embodiment of the present invention. Beginning at step 502, the logic initializes the various protocol stacks, in step 504, and also initializes the VCCT subsystem, in step 506. The logic then creates a circuit with the required APIs based upon the configuration information in the VCCT MIB, in step 508. The logic then registers a first protocol of a first protocol stack with a first API associated with the circuit, in step 510, and registers a second protocol of a second protocol stack with a second API associated with the circuit, in step 510. The logic then creates a virtual connection between the first protocol of the first protocol stack and the second protocol of the second protocol stack, in step 514, and exchanges protocol messages between the first protocol of the first protocol stack and the second protocol of the second protocol stack over the virtual connection, in step 516. The logic 500 terminates in step 599.

Figure 6:
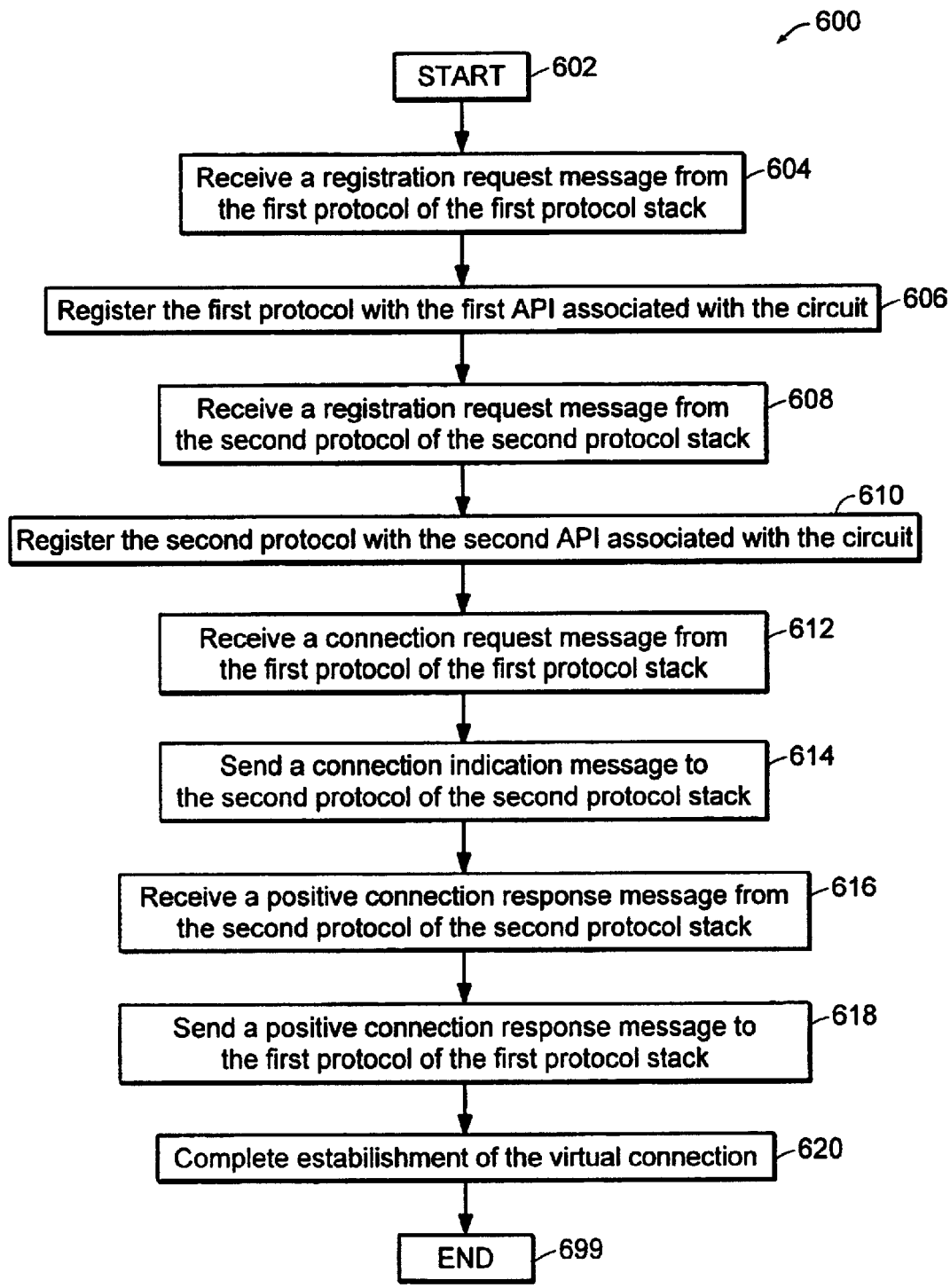
FIG. 6 is a logic flow diagram showing exemplary logic for establishing a virtual connection for interconnecting two protocol stacks in accordance with an embodiment of the present invention.

FIG. 6 is a logic flow diagram showing exemplary logic 600 for establishing a virtual connection for interconnecting two protocol stacks in accordance with an embodiment of the present invention. Beginning at step 602, after creating a circuit having the required APIs, the logic proceeds to register the first protocol of the first protocol stack and the second protocol of the second protocol stack with the circuit. Specifically, upon receiving a registration request from the first protocol of the first protocol stack, in step 604, the logic registers the first protocol with the first API associated with the circuit, in step 606. Upon receiving a registration request from the second protocol of the second protocol stack, in step 608, the logic registers the second protocol with the second API associated with the circuit, in step 610. After registering the first protocol and the second protocol, and upon receiving a connection request message from the first protocol of the first protocol stack, in step 612, the logic sends a connection indication message to the second protocol of the second protocol stack, in step 614, and waits for a response. Upon receiving a positive connection response message from the second protocol of the second protocol stack, in step 616, the logic sends a positive connection response message to the first protocol of the first protocol stack, in step 618, and proceeds to complete the establishment of the virtual connection, in step 620. The logic 600 terminates in step 699.

Figure 17:
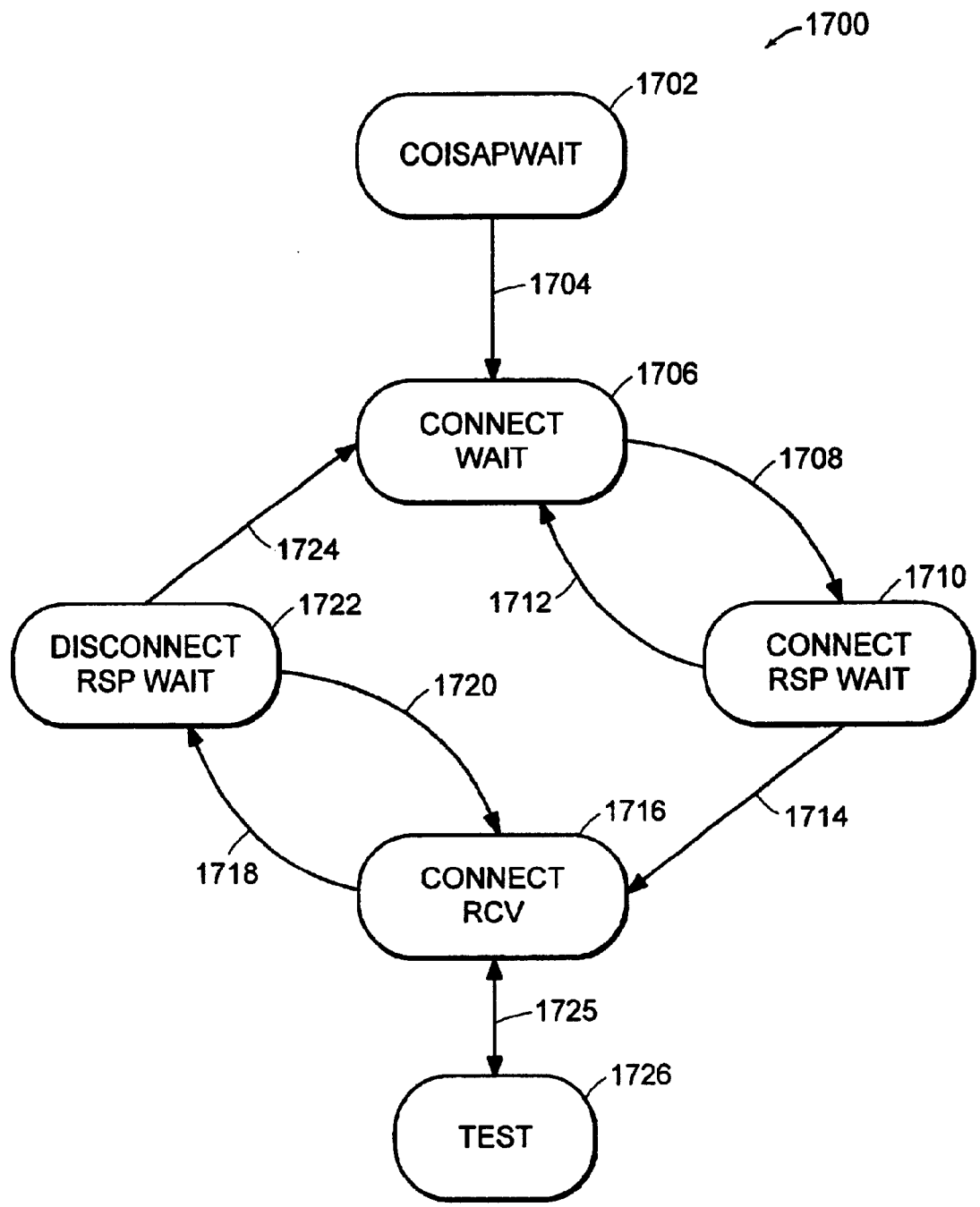
FIG. 17 is a state diagram describing certain operations of the VCCT subsystem in accordance with an embodiment of the present invention.

FIG. 17 is a state diagram 1700 describing certain operations of the VCCT subsystem. The initial state is the COISAPWAIT state 1702. In the COISAPWAIT state 1702, the VCCT subsystem waits for all protocol stacks associated with a circuit to register, at which time the VCCT subsystem transitions into the CONNECT WAIT state 1706, as shown by the transition 1704. In the CONNECT WAIT state 1706, the VCCT subsystem waits for a connection request message from one of the protocol stacks, at which time the .VCCT subsystem transitions into the CONNECT RSP WAIT state 1710, as shown by the transition 1708. In the CONNECT RSP WAIT state 1710, the VCCT subsystem sends a connection indication message to the other protocol stack and waits for a response. If the VCCT subsystem receives a negative response indicating that the other protocol stack is unable to connect, then the VCCT subsystem transitions back to the CONNECT WAIT state 1706, as shown by the transition 1712. However, if the VCCT subsystem receives a positive response indicating that the other protocol stack is able to connect, then the VCCT subsystem transitions into the CONNECT RCV STATE 1716, as shown by the transition 1714.

The CONNECT RCV state 1716 is essentially the operational state for the VCCT subsystem. In the CONNECT RCV state 1716, the VCCT subsystem maintains the virtual connection and converts protocol messages between the first protocol stack and the second protocol stack. The VCCT subsystem maintains the virtual connection until a protocol stack disconnects the virtual connection, a protocol stack deregisters, or the VCCT subsystem performs a test.

Specifically, the VCCT subsystem may receive a disconnect request from one of the protocol stacks. When the VCCT subsystem receives a disconnect request from one of the protocol stacks, the VCCT subsystem transitions into the DISCONNECT RSP WAIT state 1722, as shown by the transition 1718. In the DISCONNECT RSP WAIT state 1722, the VCCT subsystem sends a disconnect indication message to the other protocol stack, and waits for a response. If the VCCT subsystem receives a negative response indicating that the other protocol stack is unable to disconnect, then the VCCT subsystem transitions back to the CONNECT RCV state 1716, as shown by the transition 1720. However, if the VCCT subsystem receives a positive response indicating that the other protocol stack is able to disconnect, then the VCCT subsystem transitions back to the CONNECT WAIT STATE 1706, as shown by the transition 1724.

Alternatively, the VCCT subsystem may receive a deregister request from one of the protocol stacks. A deregistration is essentially a forced disconnect. When the VCCT subsystem receives a deregister request from one of the protocol stacks, the VCCT subsystem sends a disconnect indication to the other protocol stack, terminates the virtual connection, and deregisters the protocol stack. This causes the VCCT subsystem to transition back to the COISAPWAIT state 1702. For convenience, the deregistration transitions are not shown in FIG. 17.

Under certain conditions, the VCCT must perform a test. For example, the VCCT subsystem may perform a test to determine whether all registered protocol stacks are operational. In this case, the VCCT subsystem transitions into the TEST state 1726, as shown by the transition 1725. In the TEST state 1726, the VCCT subsystem sends a test message periodically to the protocol stacks, and may send a disconnect indication to any protocol stack that does not response to the test message. For convenience, the test transitions are not shown in FIG. 17.

Figure 7:
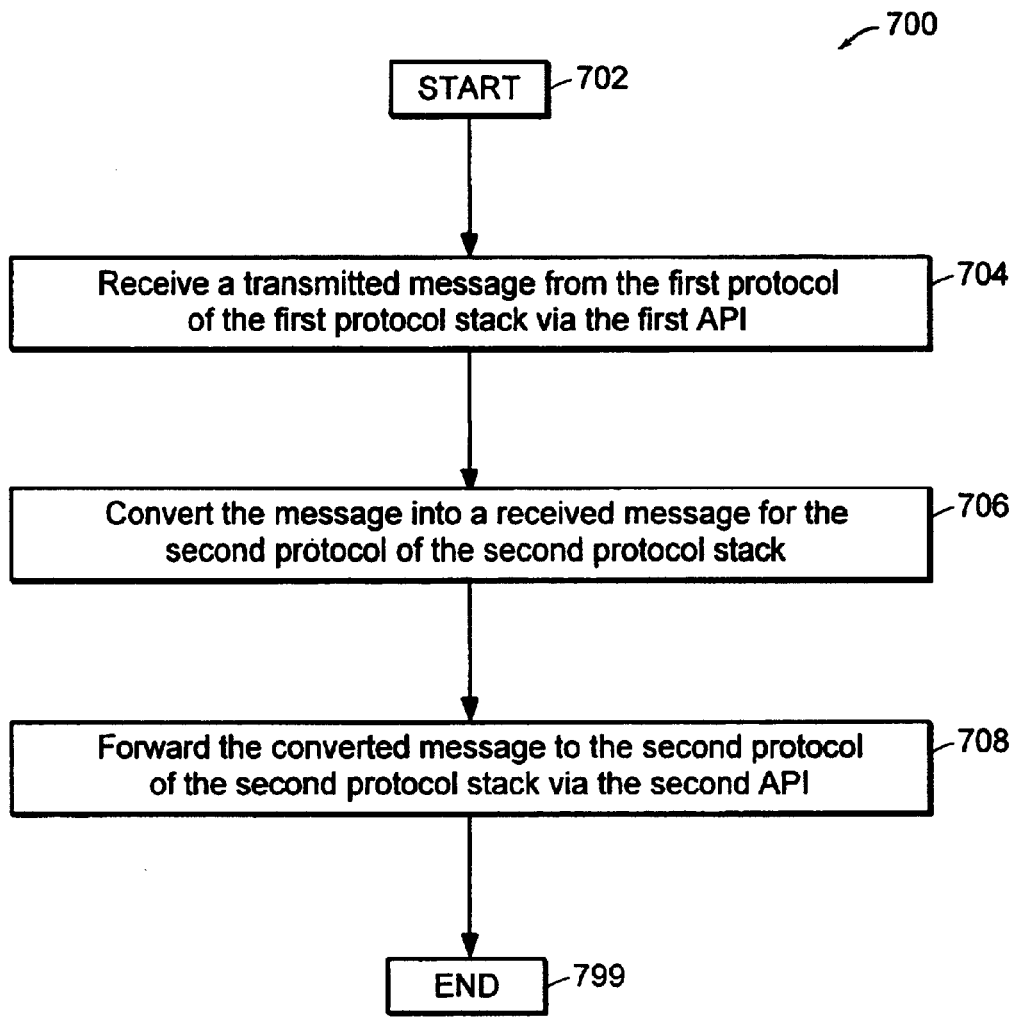
FIG. 7 is a logic flow diagram showing exemplary logic for exchanging protocol messages between two interconnected protocol stacks in accordance with an embodiment of the present invention.

Once the virtual connection is established between the first protocol and the second protocol, the VCCT subsystem transfers protocol messages between the first protocol and the second protocol over the virtual connection. FIG. 7 is a logic flow diagram showing exemplary logic 700 for exchanging protocol messages between two interconnected protocol stacks in accordance with an embodiment of the present invention. Beginning at step 702, and upon receiving a transmitted message from the first protocol of the first protocol stack via the first API, in step 704, the logic converts the message into a received message for the second protocol of the second protocol stack, in step 706, and forwards the converted message to the second protocol of the second protocol stack via the second API, in step 708. The logic 700 terminates in step 799.

The VCCT subsystem can be used to interconnect protocol stacks in various networking environments, some of which are described hereinafter. No attempt is made to describe all such networking environments, and the present invention is in no way limited to any particular networking environment.

Figure 8:
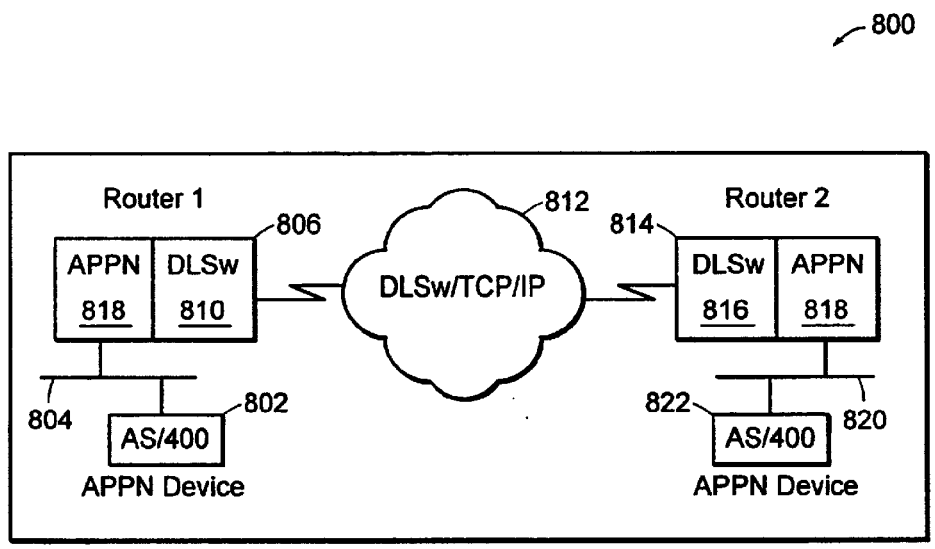
FIG. 8 is a block diagram showing an exemplary communication system in which APPN devices are interconnected over a DLSw communication network.

In one networking environment, Advanced Peer-to-Peer Networking (APPN) devices are interconnected over a Data Link Switching (DLSw) communication network. DLSw is a protocol for transporting connection-oriented SNA messages across an Internet Protocol (IP) network. FIG. 8 is a block diagram showing an exemplary communication system 800 in which APPN devices are interconnected over a DLSw communication network. Specifically, a first APPN device 802 is coupled via a first LAN 804 to a first router 806, which includes an APPN protocol stack 808 and a DLSw protocol stack 810. A second APPN device 822 is coupled via a second LAN 820 to a second router 814, which includes a DLSw protocol stack 816 and an APPN protocol stack 818. The first router 806 and the second router 814 are interconnected over a DLSw/TCP/IP network 812. In order for the first APPN device 802 and the second APPN device 822 to exchange protocol messages, there must be an interconnection between the APPN protocol stack 808 and the DLSw protocol stack 810 in the first router 806 as well as an interconnection between the DLSw protocol stack 816 and the APPN protocol stack 818 in the second router 814.

Figure 9:
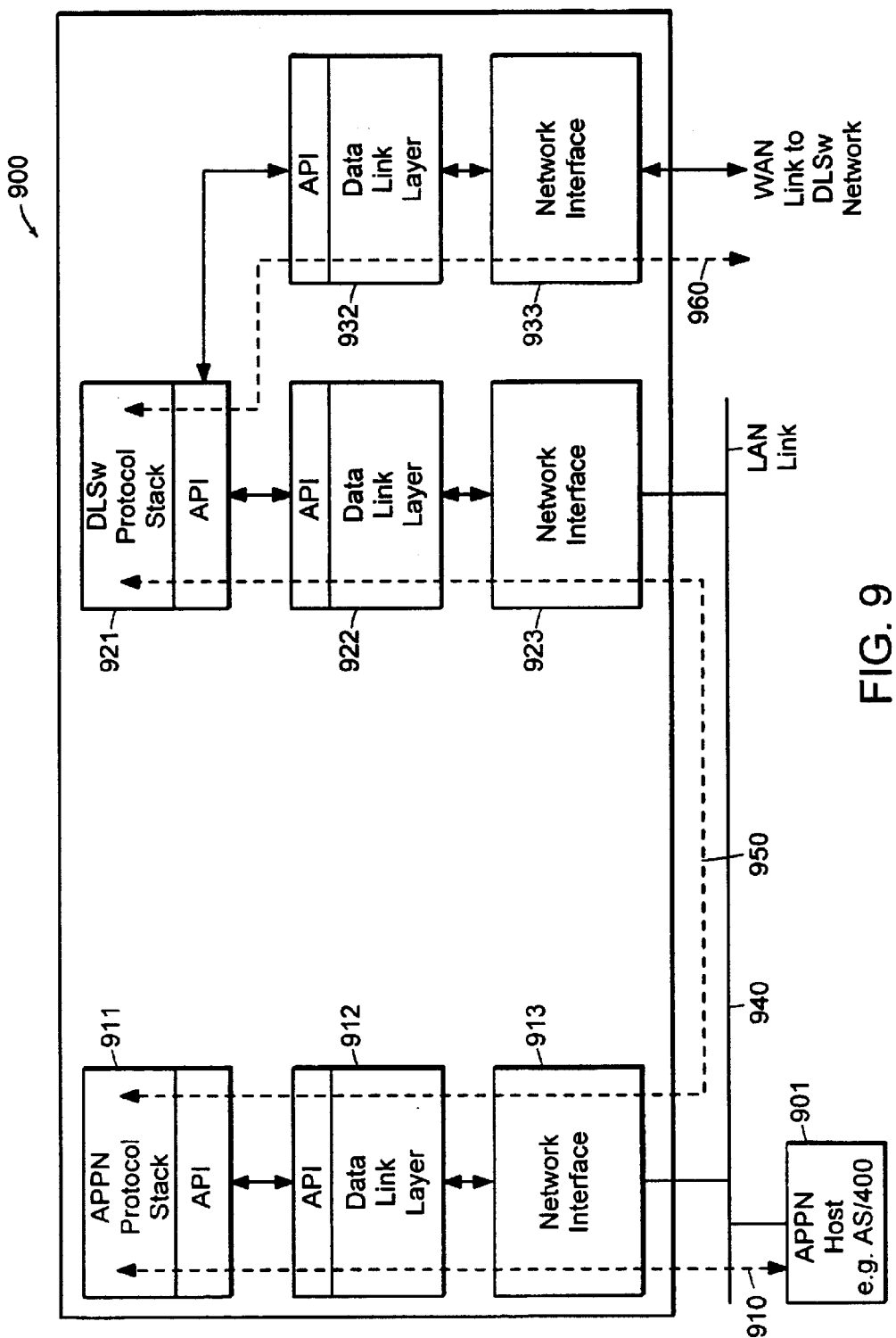
FIG. 9 is a block diagram showing an exemplary network device in which an APPN protocol stack and a DLSw protocol stack are interconnected over an external connection in order to enable APPN devices to communicate over a DLSw communication network as is known in the prior art.

In a typical prior art embodiment, the protocol stacks are interconnected using external connections. FIG. 9 is a block diagram showing an exemplary network device 900 in which an APPN protocol stack 911 and a DLSw protocol stack 921 are interconnected over an external connection in order to enable an APPN device 901 to communicate over a DLSw communication network. The network device 900 includes an APPN protocol stack 911 and a DLSw protocol stack 921. The APPN protocol stack 911 is coupled through an API to a first data link layer 912, which in turn is coupled to a first network interface 913. The DLSw protocol stack 921 is coupled through an API to a second data link layer 922, which in turn is coupled to a second network interface 923. The first network interface 913, the second network interface 923, and the APPN device 901 are interconnected via an external LAN connection 940. Protocol messages are exchanged between the APPN protocol stack 911 and the DLSw protocol stack 921 over the external LAN connection 940, as shown by the protocol message flow 950. The DLSw protocol stack 921 is also coupled through an API to a third data link layer 932, which in turn is coupled to a third network interface 933. The third network interface 933 is coupled to a DLSw network via a WAN link. The DLSw protocol stack 921 transmits and receives protocol messages over the WAN link via the third data link layer 932 and the third network interface 933, as shown by the protocol message flow 960. Thus, for example, a protocol message generated by the APPN host 901 is sent to the APPN protocol stack 911, as shown by the protocol message flow 910; the APPN protocol stack 911 forwards the protocol message to the DLSw protocol stack 921 over the external LAN connection 940, as shown by the protocol message flow 950; and the DLSw protocol stack 921 forwards the protocol message over the WAN link, as shown by the protocol message flow 960. Similarly, a protocol message received over the WAN link is forwarded to the DLSw protocol stack 921, as shown by the protocol message flow 960; the DLSw protocol stack 921 forwards the protocol message to the APPN protocol stack 911 over the external connection 940, as shown by the protocol message flow 950; and the APPN protocol stack 911 forwards the protocol message to the APPN device 901, as shown by the protocol message flow 910.

Figure 10:
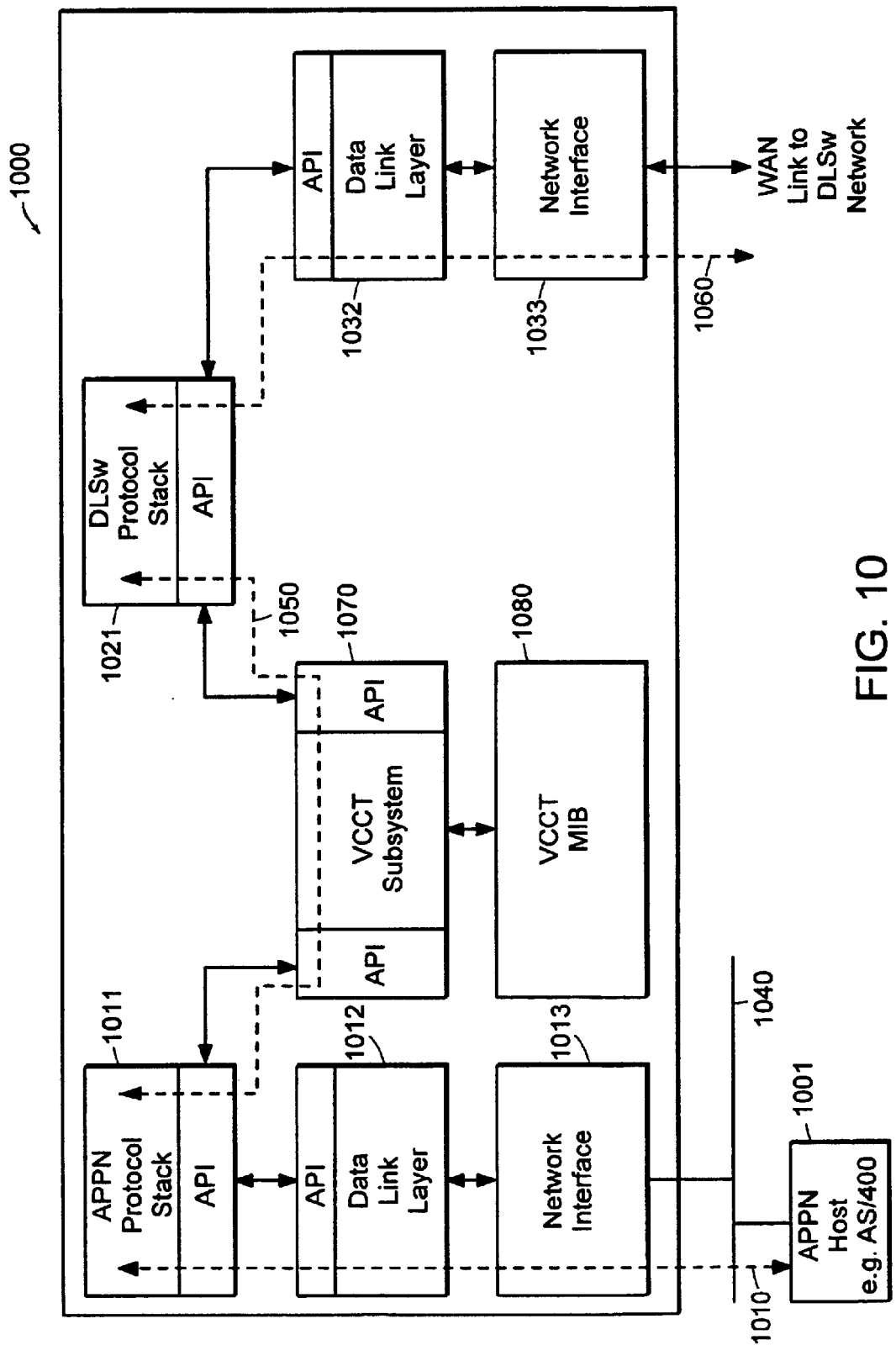
FIG. 10 is a block diagram showing an exemplary network device in which an APPN protocol stack and a DLSw protocol stack are interconnected internally via a virtual circuit subsystem in order to enable APPN devices to communicate over a DLSw communication network in accordance with an embodiment of the present invention.

In an exemplary embodiment of the invention, the protocol stacks are interconnected internally via the VCCT subsystem. FIG. 10 is a block diagram showing an exemplary network device 1000 in which an APPN protocol stack 1011 and a DLSw protocol stack 1021 are interconnected internally via a VCCT subsystem 1070 in order to enable an APPN device 1001 to communicate over a DLSw communication network. The network device 1000 includes an APPN protocol stack 1011 and a DLSw protocol stack 1021. The APPN protocol stack 1011 is coupled through an API to a first data link layer 1012, which in turn is coupled to a first network interface 1013, which in turn is coupled to the APPN device 1001 via a LAN connection 1040. The APPN protocol stack 1011 is also coupled through an API to the VCCT subsystem 1070. The DLSw protocol stack 1021 is coupled through an API to the VCCT subsystem 1070. The VCCT subsystem 1070 establishes a virtual connection between the APPN protocol stack 1011 and the DLSw protocol stack 1021 based upon configuration information maintained in a VCCT Management Information Base (MIB) 1080. Protocol messages are exchanged between the APPN protocol stack 1011 and the DLSw protocol stack 1021 over the virtual connection established by the VCCT subsystem 1070, as shown by the protocol message flow 1050. The DLSw protocol stack 1021 is also coupled through an API to a second data link layer 1032, which in turn is coupled to a second network interface 1033. The second network interface 1033 is coupled to a DLSw network via a WAN link. The DLSw protocol stack 1021 transmits and receives protocol messages over the WAN link via the second data link layer 1032 and the second network interface 1033, as shown by the protocol message flow 1060. Thus, for example, a protocol message generated by the APPN device 1001 is sent to the APPN protocol stack 1011, as shown by the protocol message flow 1010; the APPN protocol stack forwards the protocol message to the DLSw protocol stack 1021 via the VCCT subsystem 1070, as shown by the protocol message flow 1050; and the DLSw protocol stack 1021 forwards the protocol message over the WAN link, as shown by the protocol message flow 1060. Similarly, a protocol message received over the WAN link is forwarded to the DLSw protocol stack 1021, as shown by the protocol message flow 1060; the DLSw protocol stack 1021 forwards the protocol message to the APPN protocol stack 1011 via the VCCT subsystem 1070, as shown by the protocol message flow 1050; and the APPN protocol stack 1011 forwards the protocol message to the APPN device 1001, as shown by the protocol message flow 1010.

Figure 11:
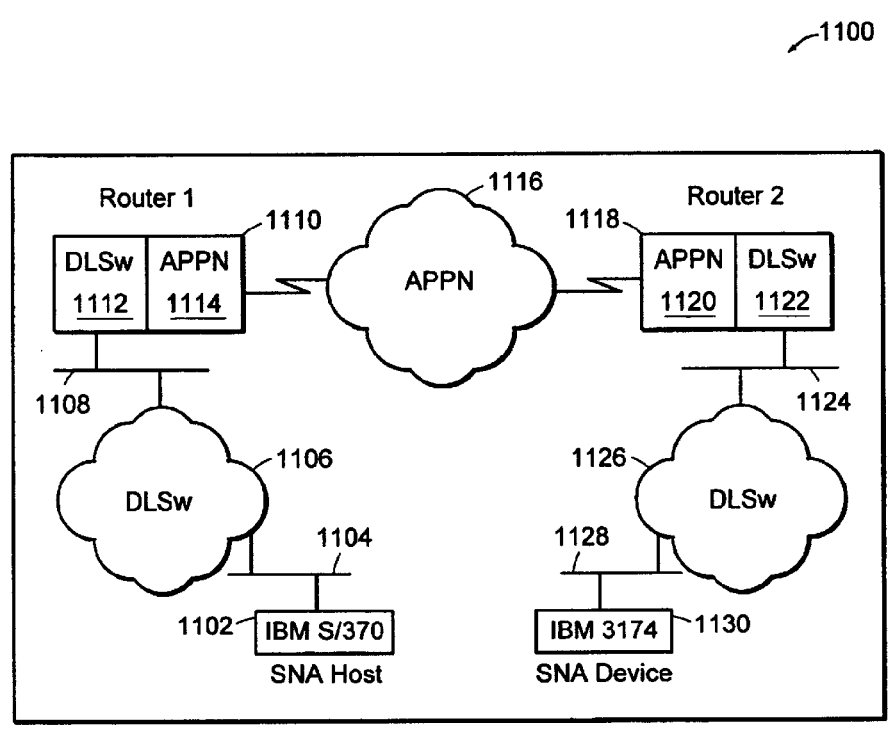
FIG. 11 is a block diagram showing an exemplary communication system in which DLSw devices are interconnected over an APPN communication network.

In another networking environment, DLSw devices are interconnected over an APPN network. FIG. 11 is a block diagram showing an exemplary communication system 1100 in which DLSw devices are interconnected over an APPN communication network. Specifically, a first DLSw device 1102 is coupled via a first LAN 1104 to a first DLSw network 1106, which in turn is coupled via a second LAN 1108 to a first router 1110 that includes a DLSw protocol stack 1112 and an APPN protocol stack 1114. A second DLSw device 1130 is coupled via a third LAN 1128 to a second DLSw network 1126, which in turn is coupled via a fourth LAN 1124 to a second router 1118 that includes an APPN protocol stack 1120 and a DLSw protocol stack 1122. The first router 1110 and the second router 1118 are interconnected over an APPN network 1116. In order for the first DLSw device 1102 and the second DLSw device 1130 to exchange protocol messages, there must be an interconnection between the DLSw protocol stack 1112 and the APPN protocol stack 1114 in the first router 1110 as well as an interconnection between the APPN protocol stack 1120 and the DLSw protocol stack 1122 in the second router 1118.

Figure 12:
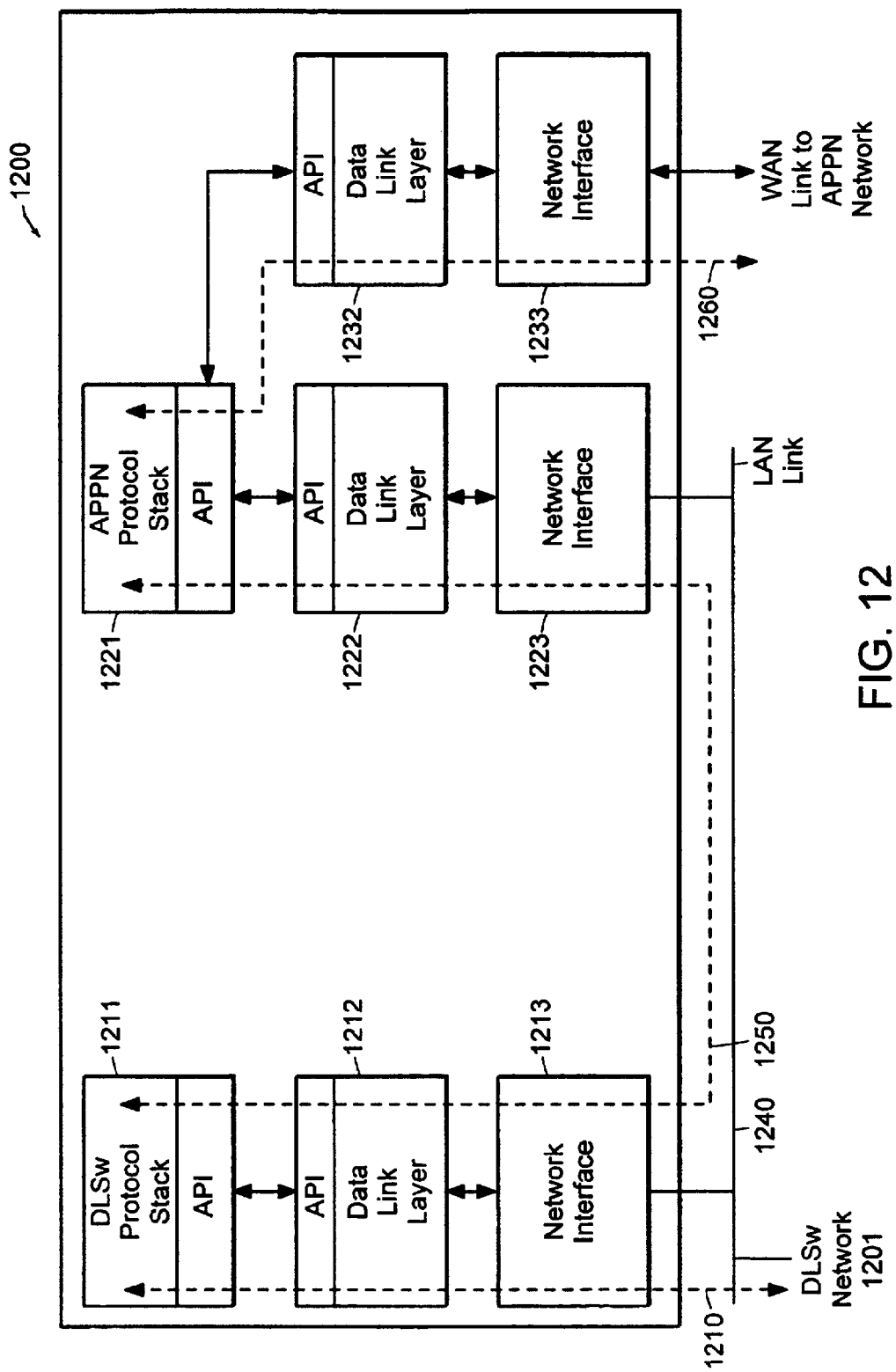
FIG. 12 is a block diagram showing an exemplary network device in which a DLSw protocol stack and an APPN protocol stack are interconnected over an external connection in order to enable DLSw devices to communicate over an APPN communication network as is known in the prior art.

In a typical prior art embodiment, the protocol stacks are interconnected using external connections. FIG. 12 is a block diagram showing an exemplary network device 1200 in which a DLSw protocol stack 1211 and an APPN protocol stack 1221 are interconnected over an external connection in order to enable a DLSw device in a DLSw network 1201 to communicate over an APPN communication network. The network device 1200 includes a DLSw protocol stack 1211 and an APPN protocol stack 1221. The DLSw protocol stack 1211 is coupled through an API to a first data link layer 1212, which in turn is coupled to a first network interface 1213. The APPN protocol stack 1221 is coupled through an API to a second data link layer 1222, which in turn is coupled to a second network interface 1223. The first network interface 1213, the second network interface 1223, and the DLSw device (via the DLSw network 1201) are interconnected via an external LAN connection 1240. Protocol messages are exchanged between the DLSw protocol stack 1211 and the APPN protocol stack 1221 over the external LAN connection 1240, as shown by the protocol message flow 1250. The APPN protocol stack 1221 is also coupled through an API to a third data link layer 1232, which in turn is coupled to a third network interface 1233. The third network interface 1233 is coupled to an APPN network via a WAN link. The APPN protocol stack 1221 transmits and receives protocol messages over the WAN link via the third data link layer 1232 and the third network interface 1233, as shown by the protocol message flow 1260. Thus, for example, a protocol message generated by the DLSw device 1201 is sent to the DLSw protocol stack 1211, as shown by the protocol message flow 1210; the DLSw protocol stack 1211 forwards the protocol message to the APPN protocol stack 1221 over the external LAN connection 1240, as shown by the protocol message flow 1250; and the APPN protocol stack 1221 forwards the protocol message over the WAN link, as shown by the protocol message flow 1260. Similarly, a protocol message received over the WAN link is forwarded to the APPN protocol stack 1221, as shown by the protocol message flow 1260; the APPN protocol stack 1221 forwards the protocol message to the DLSw protocol stack 1211 over the external connection 1240, as shown by the protocol message flow 1250; and the DLSw protocol stack 1211 forwards the protocol message to the DLSw device 1201, as shown by the protocol message flow 1210.

Figure 13:
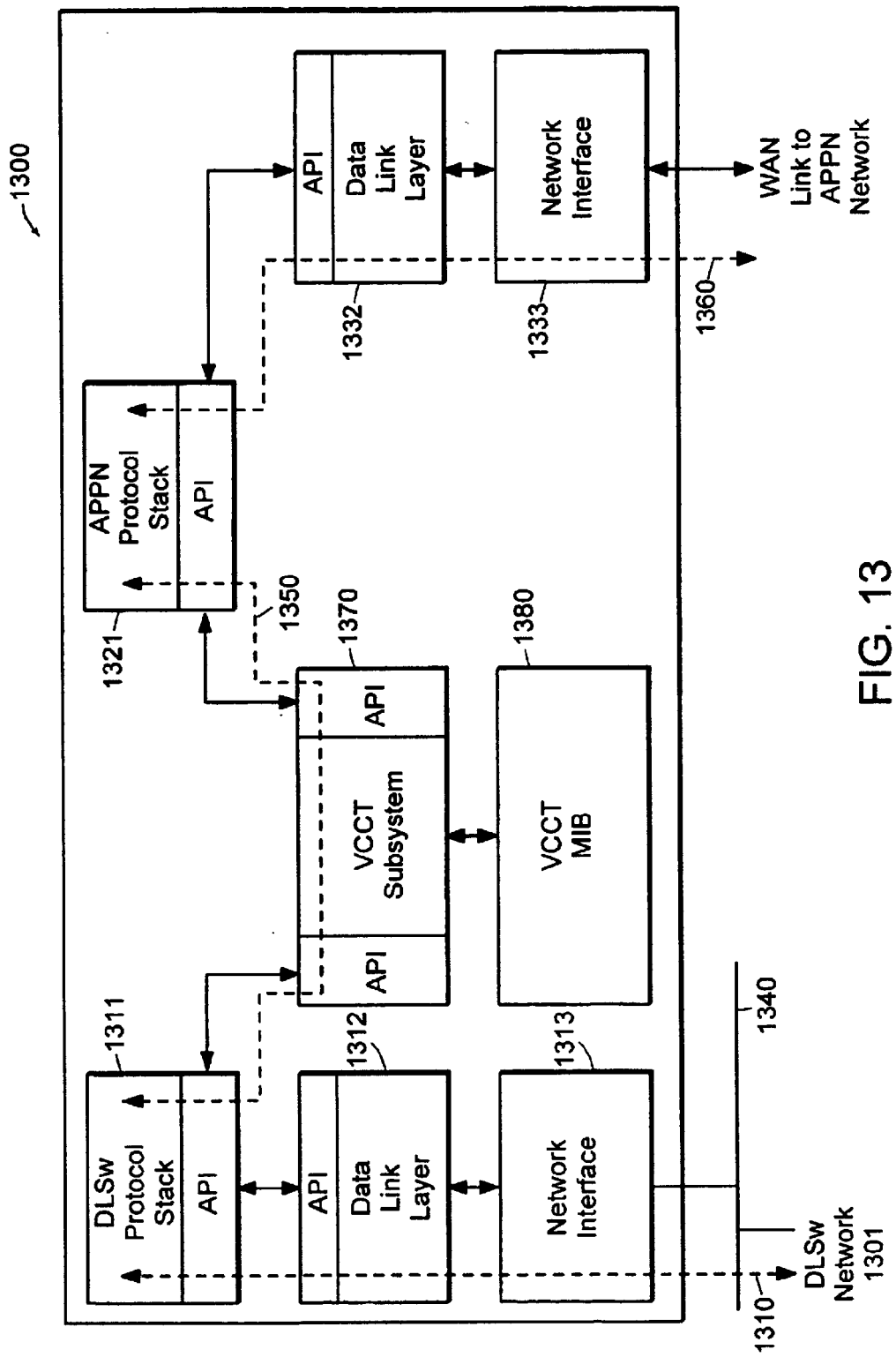
FIG. 13 is a block diagram showing an exemplary network device in which a DLSw protocol stack and an APPN protocol stack are interconnected internally via a virtual circuit subsystem in order to enable DLSw devices to communicate over an APPN communication network in accordance with an embodiment of the present invention.

In an exemplary embodiment of the invention, the protocol stacks are interconnected internally via the VCCT subsystem. FIG. 13 is a block diagram showing an exemplary network device 1300 in which a DLSw protocol stack 1311 and an APPN protocol stack 1321 are interconnected internally via a VCCT subsystem 1370 in order to enable a DLSw device in a DLSw network 1301 to communicate over an APPN communication network. The network device 1300 includes a DLSw protocol stack 1311 and an APPN protocol stack 1321. The DLSw protocol stack 1311 is coupled through an API to a first data link layer 1312, which in turn is coupled to a first network interface 1313, which in turn is coupled to the DLSw network 1301 via a LAN connection 1340. The DLSw protocol stack 1311 is also coupled through an API to the VCCT subsystem 1370. The APPN protocol stack 1321 is coupled through an API to the VCCT subsystem 1370. The VCCT subsystem 1370 establishes a virtual connection between the DLSw protocol stack 1311 and the APPN protocol stack 1321 based upon configuration information maintained in a VCCT Management Information Base (MIB) 1380. Protocol messages are exchanged between the DLSw protocol stack 1311 and the APPN protocol stack 1321 over the virtual connection established by the VCCT subsystem 1370, as shown by the protocol message flow 1350. The APPN protocol stack 1321 is also coupled through an API to a second data link layer 1332, which in turn is coupled to a second network interface 1333. The second network interface 1333 is coupled to an APPN network via a WAN link. The APPN protocol stack 1321 transmits and receives protocol messages over the WAN link via the second data link layer 1332 and the second network interface 1333, as shown by the protocol message flow 1360. Thus, for example, a protocol message generated by the DLSw device in the DLSw network 1301 is sent to the DLSw protocol stack 1311, as shown by the protocol message flow 1310; the DLSw protocol stack forwards the protocol message to the APPN protocol stack 1321 via the VCCT subsystem 1370, as shown by the protocol message flow 1350; and the APPN protocol stack 1321 forwards the protocol message over the WAN link, as shown by the protocol message flow 1360. Similarly, a protocol message received over the WAN link is forwarded to the APPN protocol stack 1321, as shown by the protocol message flow 1360; the APPN protocol stack 1321 forwards the protocol message to the DLSw protocol stack 1311 via the VCCT subsystem 1370, as shown by the protocol message flow 1350; and the DLSw protocol stack 1311 forwards the protocol message to the DLSw device in the DLSw network 1301, as shown by the protocol message flow 1310.

Figure 14:
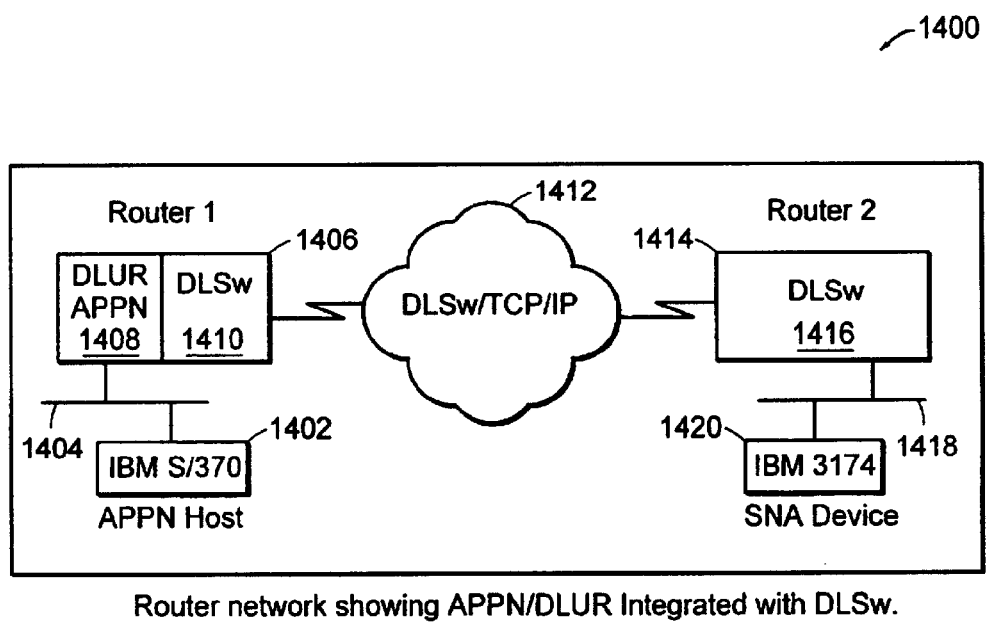
FIG. 14 is a block diagram showing an exemplary communication system in which APPN device is interconnected with a DLSw device over a DLSw communication network.

In yet another networking environment, an APPN device is interconnected with a DLSw device over a DLSw communication network. FIG. 14 is a block diagram showing an exemplary communication system 1400 in which an APPN device is interconnected with a DLSw device over a DLSw communication network. Specifically, an APPN device 1402 is coupled via a first LAN 1404 to a first router 1406, which includes an APPN/DLUR protocol stack 1408 and a DLSw protocol stack 1410. DLUR (Dependent Logical Unit Requester) is an extension to APPN that enables an APPN device to communicate with a legacy SNA device. A DLSw device 1420 is coupled via a second LAN 1418 to a second router 1414, which includes a DLSw protocol stack 1416. The first router 1406 and the second router 1414 are interconnected over a DLSw/TCP/IP network 1412. In order for the APPN device 1402 and the DLSw device 1420 to exchange protocol messages, there must be an interconnection between the APPN/DLUR protocol stack 1408 and the DLSw protocol stack 1410 in the first router 1406.

Figure 15:
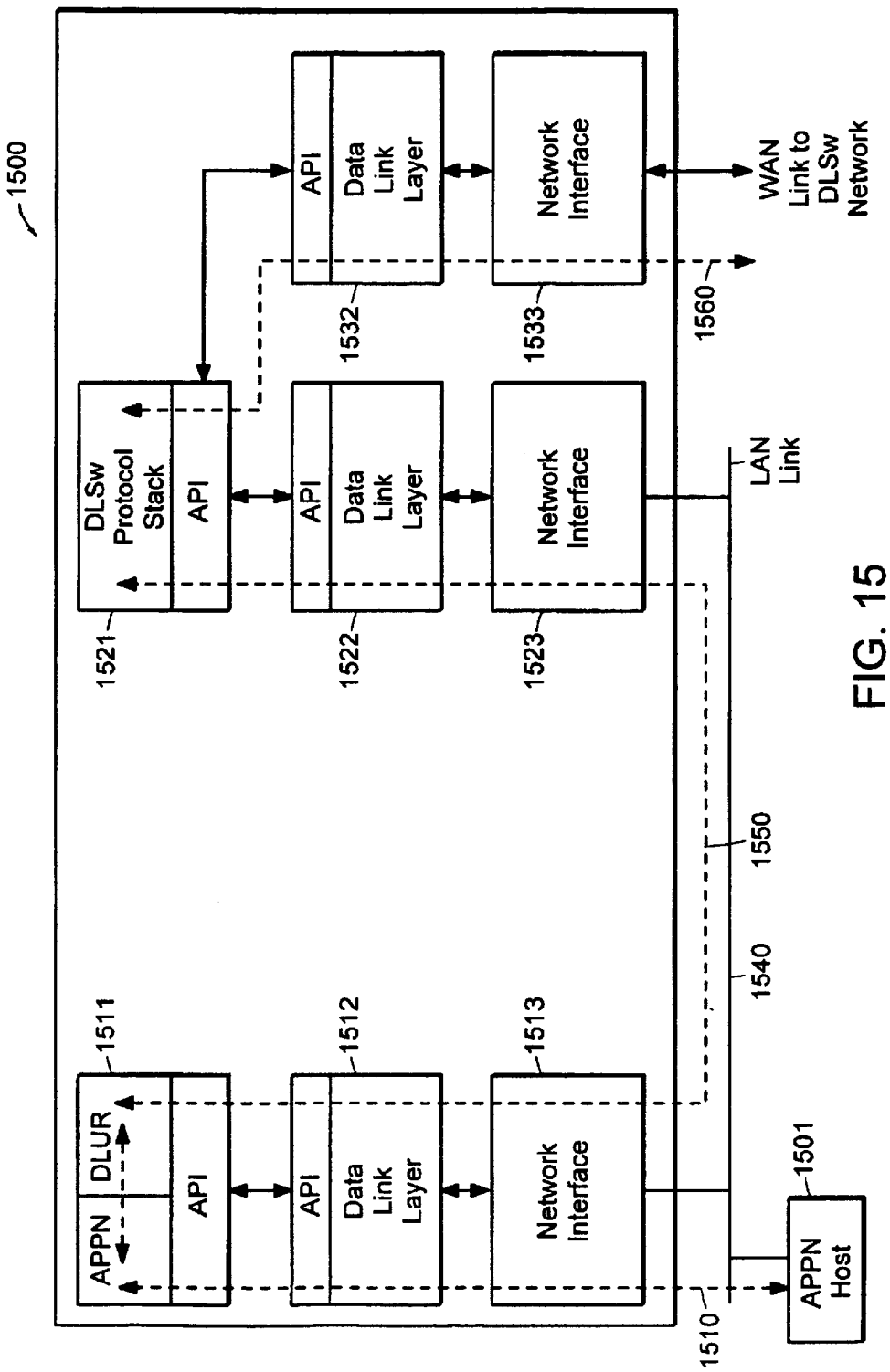
FIG. 15 is a block diagram showing an exemplary network device in which an APPN/DLUR protocol stack and a DLSw protocol stack are interconnected over an external connection in order to enable an APPN device to communicate with a DLSw device over a DLSw communication network as is known in the prior art.

In a typical prior art embodiment, the protocol stacks are interconnected using external connections. FIG. 15 is a block diagram showing an exemplary network device 1500 in which an APPN/DLUR protocol stack 1511 and a DLSw protocol stack 1521 are interconnected over an external connection in order to enable an APPN device 1501 to communicate over a DLSw communication network. The network device 1500 includes an APPN/DLUR protocol stack 1511 and a DLSw protocol stack 1521. The APPN/DLUR protocol stack 1511 is coupled through an API to a first data link layer 1512, which in turn is coupled to a first network interface 1513. The DLSw protocol stack 1521 is coupled through an API to a second data link layer 1522, which in turn is coupled to a second network interface 1523. The first network interface 1513, the second network interface 1523, and the APPN device 1501 are interconnected via an external LAN connection 1540. Protocol messages are exchanged between the APPN/DLUR protocol stack 1511 and the DLSw protocol stack 1521 over the external LAN connection 1540, as shown by the protocol message flow 1550. The DLSw protocol stack 1521 is also coupled through an API to a third data link layer 1532, which in turn is coupled to a third network interface 1533. The third network interface 1533 is coupled to a DLSw network via a WAN link. The DLSw protocol stack 1521 transmits and receives protocol messages over the WAN link via the third data link layer 1532 and the third network interface 1533, as shown by the protocol message flow 1560. Thus, for example, a protocol message generated by the APPN host 1501 is sent to the APPN/DLUR protocol stack 1511, as shown by the protocol message flow 1510; the APPN/DLUR protocol stack 1511 forwards the protocol message to the DLSw protocol stack 1521 over the external LAN connection 1540, as shown by the protocol message flow 1550; and the DLSw protocol stack 1521 forwards the protocol message over the WAN link, as shown by the protocol message flow 1560. Similarly, a protocol message received over the WAN link is forwarded to the DLSw protocol stack 1521, as shown by the protocol message flow 1560; the DLSw protocol stack 1521 forwards the protocol message to the APPN/DLUR protocol stack 1511 over the external connection 1540, as shown by the protocol message flow 1550; and the APPN/DLUR protocol stack 1511 forwards the protocol message to the APPN device 1501, as shown by the protocol message flow 1510.

Figure 16:
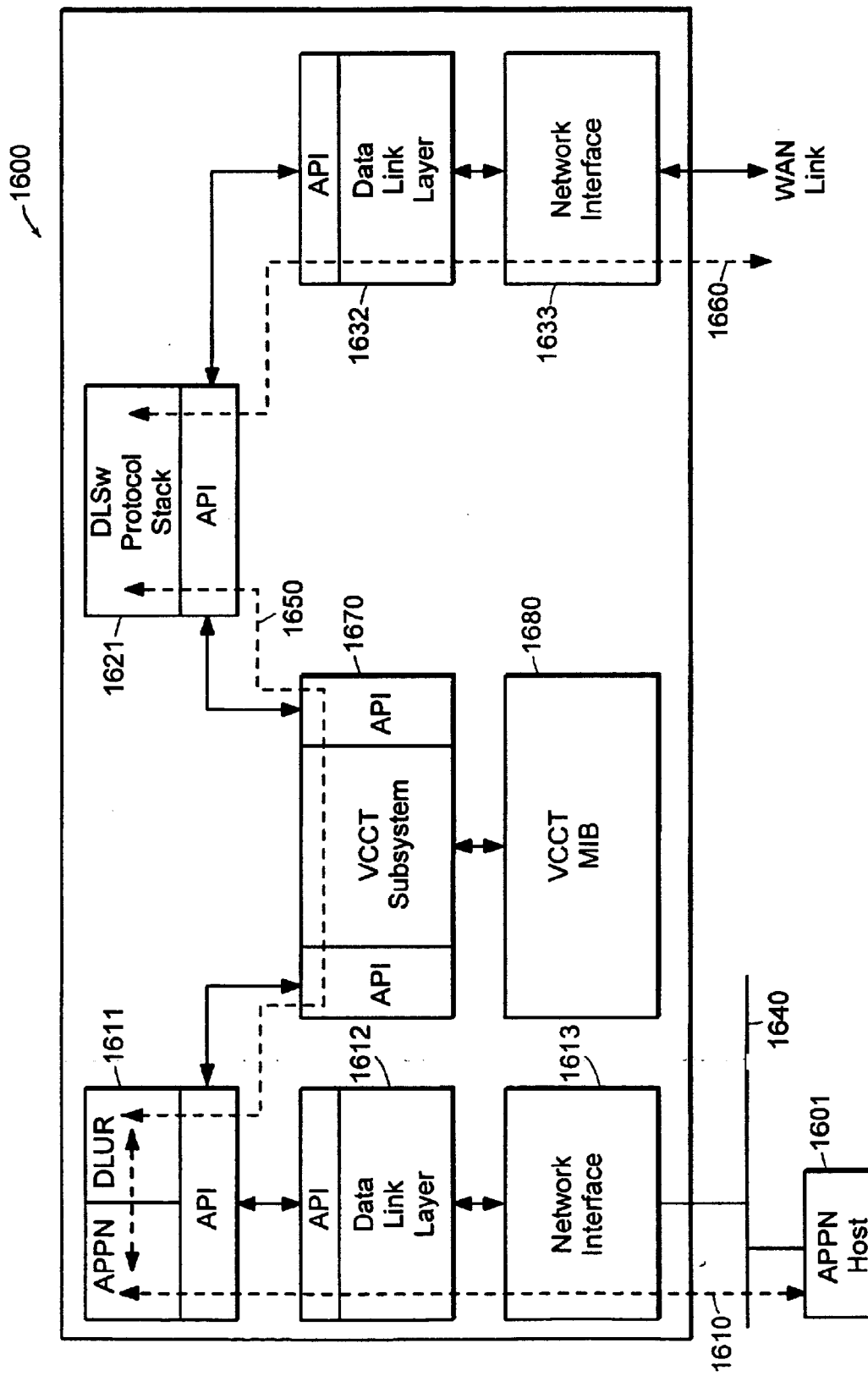
FIG. 16 is a block diagram showing an exemplary network device in which an APPN/DLUR protocol stack and a DLSw protocol stack are interconnected internally via a virtual circuit subsystem in order to enable an APPN devices to communicate with a DLSw device over a DLSw communication network in accordance with an embodiment of the present invention.

In an exemplary embodiment of the invention, the protocol stacks are interconnected internally via the VCCT subsystem. FIG. 16 is a block diagram showing an exemplary network device 1600 in which an APPN/DLUR protocol stack 1611 and a DLSw protocol stack 1621 are interconnected internally via a VCCT subsystem 1670 in order to enable an APPN device 1601 to communicate over a DLSw communication network. The network device 1600 includes an APPN/DLUR protocol stack 1611 and a DLSw protocol stack 1621. The APPN/DLUR protocol stack 1611 is coupled through an API to a first data link layer 1612, which in turn is coupled to a first network interface 1613, which in turn is coupled to the APPN device 1601 via a LAN connection 1640. The APPN/DLUR protocol stack 1611 is also coupled through an API to the VCCT subsystem 1670. The DLSw protocol stack 1621 is coupled through an API to the VCCT subsystem 1670. The VCCT subsystem 1670 establishes a virtual connection between the APPN/DLUR protocol stack 1611 and the DLSw protocol stack 1621 based upon configuration information maintained in a VCCT Management Information Base (MIB) 1680. Protocol messages are exchanged between the APPN/DLUR protocol stack 1611 and the DLSw protocol stack 1621 over the virtual connection established by the VCCT subsystem 1670, as shown by the protocol message flow 1650. The DLSw protocol stack 1621 is also coupled through an API to a second data link layer 1632, which in turn is coupled to a second network interface 1633. The second network interface 1633 is coupled to a DLSw network via a WAN link. The DLSw protocol stack 1621 transmits and receives protocol messages over the WAN link via the second data link layer 1632 and the second network interface 1633, as shown by the protocol message flow 1660. Thus, for example, a protocol message generated by the APPN device 1601 is sent to the APPN/DLUR protocol stack 1611, as shown by the protocol message flow 1610; the APPN/DLUR protocol stack forwards the protocol message to the DLSw protocol stack 1621 via the VCCT subsystem 1670, as shown by the protocol message flow 1650; and the DLSw protocol stack 1621 forwards the protocol message over the WAN link, as shown by the protocol message flow 1660. Similarly, a protocol message received over the WAN link is forwarded to the DLSw protocol stack 1621, as shown by the protocol message flow 1660; the DLSw protocol stack 1621 forwards the protocol message to the APPN/DLUR protocol stack 1611 via the VCCT subsystem 1670, as shown by the protocol message flow 1650; and the APPN/DLUR protocol stack 1611 forwards the protocol message to the APPN device 1601, as shown by the protocol message flow 1610.

In an exemplary embodiment of the invention, the VCCT subsystem is managed through a VCCT MIB. The VCCT MIB defines various management objects that can be accessed and controlled through an SNMP agent. The VCCT MIB objects are divided into subsystem-related objects and connection-related objects. The subsystem-related objects relate to the VCCT subsystem as a whole, such as (1) whether or not the VCCT subsystem is to be installed; (2) whether the VCCT subsystem, if installed, is enabled or disabled; and (3) the VCCT subsystem state (up, down, init, not present). The connection-related objects are stored in a table, where each table entry relates to one virtual connection. The connection-related objects in a table entry relate to one particular virtual connection, such as (1) whether to create or delete the virtual connection; (2) whether the virtual connection, if created, is enabled or disabled; (3) the virtual connection state (COISAPWAIT, CONNECT WAIT, CONNECT RSP WAIT, CONNECT RCV, DISCONNECT RSP WAIT); (4) the slot on which the virtual connection is running; (5) the circuit number associated with the virtual connection; (6) the number of protocol stacks (clients) registered on the circuit; and (7) the type of service provided by the virtual connection. The following is an exemplary VCCT MIB definition using standard MIB language constructs:

```
wfVcct OBJECT IDENTIFIER::={wfVcctGroup 1 }
wfVcctDelete OBJECT-TYPE
   SYNTAX INTEGER {
      created(1),
      deleted(2)}
   ACCESS read-write
   STATUS mandatory
   DESCRIPTION
      "Create/Delete parameter. Default is created. User
       perform an SNMP SET operation on this object
       in order to create/delete Virtual Circuit (VCCT)
       subsystem"
   DEFVAL {created}
::={wfVcct 1}
wfVcctDisable OBJECT-TYPE
   SYNTAX INTEGER {
      enabled(1),
      disabled(2)}
   ACCESS read-write
   STATUS mandatory
   DESCRIPTION
      "Enable/Disable parameter. Default is enabled. User
       perform an SNMP SET operation on this object in
       order to enable/disable Virtual Circuit (VCCT)
       subsystem"
   DEFVAL {enabled}
::={wfVcct 2}
wfVcctState OBJECT-TYPE
   SYNTAX INTEGER {
      up(1),
      down(2),
      init(3),
      notpresent(4)}
   ACCESS read-only
   STATUS mandatory
   DESCRIPTION
      "The current state of Virtual Circuit (VCCT) sub-
       system"
   DEFVAL {down}
::={wfVcct 3}
wfVcctTable OBJECT-TYPE
   SYNTAX SEQUENCE OF WfVcctEntry
   ACCESS not-accessible
   STATUS mandatory
   DESCRIPTION
      "Table of Virtual Circuit (VCCT) Connection
       Objects"
::={wfVcctGroup 2}
wfVcctEntry OBJECT-TYPE
   SYNTAX WfVcctEntry
   ACCESS not-accessible
   STATUS mandatory
   DESCRIPTION
      "An entry in the Virtual Circuit Connection Table"
   INDEX {wfVcctEntrySlot,
      wfVcctEntryCct}
::={wfVcctTable 1}
WfVcctEntry ::=SEQUENCE {
   wfVcctEntryDelete INTEGER,
   wfVcctEntryDisable INTEGER,
   wfVcctEntryState INTEGER,
   wfVcctEntrySlot INTEGER,
   wfVcctEntryCct INTEGER,
   wfVcctEntryNumClients INTEGER,
   wfVcctEntryServiceType INTEGER}
wfVcctEntryDelete OBJECT-TYPE
   SYNTAX INTEGER {
      created(1),
      deleted(2)}
   ACCESS read-write
   STATUS mandatory
   DESCRIPTION
      "Create/Delete parameter. Default is created. User
       perform an SNMP SET operation on this object
       in order to create/delete a Virtual Circuit connection"
   DEFVAL {created}
::={wfVcctEntry 1}
wfVcctEntryDisable OBJECT-TYPE
   SYNTAX INTEGER {
      enabled(1),
      disabled(2)}
   ACCESS read-write
   STATUS mandatory
   DESCRIPTION
      "Enable/Disable parameter. Default is enabled. User
       perform an SNMP SET operation on this object in
       order to enable/disable Virtual Circuit connection"
   DEFVAL {enabled}
::={wfVcctEntry 2}
wfVcctEntryState OBJECT-TYPE
   SYNTAX INTEGER {
      coisapwait(1),
      connectwait(2),
      connectrspwait(3),
      connectrcv(4),
      disconnectrspwait(5)}
   ACCESS read-only
   STATUS mandatory
```

```
        DESCRIPTION
            "Current state of the virtual circuit connection"
        DEFVAL {coisapwait}
    ::={wfVcctEntry 3}
    wfVcctEntrySlot OBJECT-TYPE
        SYNTAX INTEGER
        ACCESS read-only
        STATUS mandatory
        DESCRIPTION
            "Slot that the Virtual Circuit connection is running
                on"
    ::={wfVcctEntry 4}
    wfVcctEntryCct OBJECT-TYPE
        SYNTAX INTEGER
        ACCESS read-only
        STATUS mandatory
        DESCRIPTION
            "Circuit number of this Virtual Circuit connection"
    ::={wfVcctEntry 5}
    wfVcctEntryNumClients OBJECT-TYPE
        SYNTAX INTEGER
        ACCESS read-only
        STATUS mandatory
        DESCRIPTION
            "Total number of clients registered on this Virtual
                Circuit connection"
    ::={wfVcctEntry 6}
    wfVcctEntryServiceType OBJECT-TYPE
        SYNTAX INTEGER {
            dlcClientApi(1)}
        ACCESS read-write
        STATUS mandatory
        DESCRIPTION
            "Type of Service being provided by this Virtual
                Circuit connection"
        DEFVAL {dlcClientApi}
    ::={wfVcctEntry 7}
```

In various exemplary embodiments described herein, the VCCT subsystem emulates a data link layer for both of the interconnected protocol stacks. However, the present invention is in no way limited to operating at the data link layer. The VCCT subsystem emulate protocols at other protocol layers, and may emulate a different protocol at a different protocol layer for each interconnected protocol stack.

In an exemplary embodiment of the present invention, predominantly all of the VCCT subsystem logic is implemented as a set of computer program instructions that are stored in a computer readable medium and executed by an embedded microprocessor system within a network device. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

We claim:

1. A network device comprising:
    a first protocol stack;
    a second protocol stack; and
    a virtual circuit subsystem capable of establishing a first interface to a first protocol of the first protocol stack and a second interface to a second protocol of the second protocol stack, the virtual circuit subsystem providing a virtual connection between the first protocol of the first protocol stack and the second protocol of the second protocol stack for exchanging protocol messages between the first protocol stack and the second protocol stack, wherein the virtual circuit subsystem is operably coupled to convert a message transmitted according to the first protocol into a receive message according to the second protocol for delivery to the second protocol stack, wherein the virtual circuit subsystem is operable to convert the message transmitted according to the first protocol into a receive message according to the second protocol by, at least in part, modifying a contents of the message transmitted according to the first protocol.

2. The network device of claim 1, wherein the virtual circuit subsystem emulates a data link layer for the first protocol of the fist protocol stack and for the second protocol of the second protocol stack.

3. The network device of claim 1, wherein the first protocol stack is an APPN protocol stack, and wherein the second protocol stack is a DLSw protocol stack.

4. The network device of claim 1, wherein the first protocol stack is a DLSw protocol stack, and wherein the second protocol stack is an APPN protocol stack.

5. The network device of claim 1, wherein the first protocol stack is an APPN/DLUR protocol stack, and wherein the second protocol stack is a DLSw protocol stack.

6. The network device of claim 1, further comprising a management information base including management objects relating to the virtual circuit subsystem.

7. The network device of claim 6, further comprising a SNMP agent operably coupled to the management information base, the SNMP agent providing access to the management objects of the management information base.

8. In a network device having at least a first protocol stack and a second protocol stack, a method for interfacing the first protocol stack and the second protocol stack, the method comprising:

providing a virtual circuit subsystem capable of establishing a first interface to any of a plurality of protocols of the first protocol stack and capable of establishing a second interface to any of a plurality of protocols of the second protocol stack so that communication can occur directly between the interfaces;

establishing a virtual connection between a first protocol of the first protocol stack and a second protocol of the second protocol stack; and exchanging protocol messages between the first protocol of the first protocol stack and the second protocol of the second protocol stack over the virtual connection, wherein the protocol messages may not be required to traverse the entire first protocol stack or the entire second protocol stack, including converting protocol messages transmitted according to the first protocol into a receive messages according to the second protocol for delivery to the second protocol stack, wherein the converting protocol messages transmitted according to the first protocol into receive messages according to the second protocol includes modifying a contents of the protocol messages transmitted according to the first protocol.

9. The method of claim 8, wherein establishing a virtual connection between a first protocol of the fist protocol stack and a second protocol of the second protocol stack comprises:

registering the first protocol of the first protocol stack with a first interface associated with the virtual connection;

registering the second protocol of the second protocol stack with a second interface associated with the virtual connection;

receiving a connection request from the first protocol over the first interface; and sending a connection indication to the second protocol over the second interface.

10. The method of claim 8, wherein the first protocol stack is an APPN protocol stack, and wherein the second protocol stack is a DLSw protocol stack.

11. The method of claim 8, wherein the first protocol stack is a DLSw protocol stack, and wherein the second protocol stack is an APPN protocol stack.

12. The method of claim 8, wherein the first protocol stack is an APPN/DLUR protocol stack, and wherein the second protocol stack is a DLSw protocol stack.

13. A program product comprising a computer readable medium having embodied therein a computer program for interfacing a first protocol stack and a second protocol stack within a network device, the computer program comprising:

logic capable of establishing a first interface to any of a plurality of protocols of the first protocol stack and capable of establishing a second interface to any of a plurality of protocols of the second protocol stack so that communication can occur directly between the interfaces;

first interface logic for interfacing with a first protocol of the first protocol stack;

second interface logic for interfacing with a second protocol of the second protocol stack;

virtual connection logic interposed between the first interface logic and the second interface logic, the virtual connection logic programmed to establish a virtual connection between the first protocol of the first protocol stack and the second protocol of the second protocol stack and exchange protocol messages between the first protocol of the first protocol stack and the second protocol of the second protocol stack over the virtual connection, wherein the protocol messages may not be required to traverse the entire first protocol stack or the entire second protocol stack; and wherein the virtual connection logic for exchanging protocol messages between the first protocol of the first protocol stack and the second protocol of the second protocol stack over the virtual connection is programmed to receive a transmitted message from the first protocol of the first protocol stack via the first interface logic, convert the message into a received message according to the second protocol of the second protocol stack by, at least in part, modifying a contents of the message, and forward the converted message to the second protocol of the second protocol stack via the second interface logic.

14. The program product of claim 13, wherein the virtual connection logic for establishing a virtual connection between the first protocol of the first protocol stack and the second protocol of the second protocol stack is programmed to register the first protocol of the first protocol stack with the first interface logic, register the second protocol of the second protocol stack with the second interface logic, receive a connection request from the first protocol via the first interface logic, and send a connection indication to the second protocol via the second interface logic.

15. The program product of claim 13, wherein the first protocol stack is an APPN protocol stack, and wherein the second protocol stack is a DLSw protocol stack.

16. The program product of claim 13, wherein the first protocol stack is a DLSw protocol stack, and wherein the second protocol stack is an APPN protocol stack.

17. The program product of claim 13, wherein the first protocol stack is an APPN/DLUR protocol stack, and wherein the second protocol stack is a DLSw protocol stack.

18. A network device comprising:

a first protocol stack having a plurality of first protocols;

a second protocol stack having a plurality of second protocols;

virtual circuit means for internally interfacing between any of the plurality of first protocols and any of the plurality of second protocols in order to interface a first protocol of the first protocol stack to a second protocol of the second protocol stack so that communication occurs directly between the first protocol and the second protocol, wherein protocol messages may not be required to traverse the entire first protocol stack or the entire second protocol stack;

wherein the virtual circuit means comprises:

first interface means for interfacing with the first protocol of the first protocol stack;

second interface means for interfacing with the second protocol of the second protocol stack;

connection establishment means for establishing a virtual connection between the first protocol of the first protocol stack and the second protocol of the second protocol stack; and conversion means for exchanging protocol messages between the first protocol of the first protocol stack and the second protocol of the second protocol stack over the virtual connection; and wherein the conversion means comprises:

means for receiving a transmitted message from the first protocol of the first protocol stack via the first interface means;

means for converting the message into a received message according to the second protocol of the second protocol stack wherein the converting includes modifying a contents of the message; and means for forwarding the converted message to the second protocol of the second protocol stack via the second interface means.

* * * * *